US008996282B2

(12) United States Patent
Sasaki et al.

(10) Patent No.: US 8,996,282 B2
(45) Date of Patent: Mar. 31, 2015

(54) FUELING SYSTEMS, METHODS AND APPARATUS FOR AN INTERNAL COMBUSTION ENGINE

(75) Inventors: Shizuo Sasaki, San Antonio, TX (US); Vikram N. Iyengar, San Antonio, TX (US); Jayant V. Sarlashkar, San Antonio, TX (US); Gary D. Neely, Boerne, TX (US)

(73) Assignee: Southwest Research Institute, San Antonio, TX (US)

( * ) Notice: Subject to any disclaimer, the term of this patent is extended or adjusted under 35 U.S.C. 154(b) by 853 days.

(21) Appl. No.: 13/198,943

(22) Filed: Aug. 5, 2011

(65) Prior Publication Data

US 2013/0035842 A1  Feb. 7, 2013

(51) Int. Cl.
| | |
|---|---|
| *F02D 41/26* | (2006.01) |
| *F02D 41/40* | (2006.01) |
| *F02D 41/14* | (2006.01) |
| *F02D 41/24* | (2006.01) |
| *F02D 41/18* | (2006.01) |

(52) U.S. Cl.
CPC ............ *F02D 41/40* (2013.01); *F02D 41/1455* (2013.01); *F02D 41/2451* (2013.01); *Y02T 10/44* (2013.01); *F02D 41/18* (2013.01); *F02D 2200/101* (2013.01); *F02D 2200/602* (2013.01)
USPC ........................................................ 701/109

(58) Field of Classification Search
CPC ............ F02D 41/1455; F02D 41/2451; F02D 41/2464; F02D 2200/602
USPC ................... 701/103, 104, 105, 109; 123/478
See application file for complete search history.

(56) References Cited

U.S. PATENT DOCUMENTS

| | | | | | |
|---|---|---|---|---|---|
| 4,883,038 | A | * | 11/1989 | Nakaniwa | 123/436 |
| 6,612,292 | B2 | * | 9/2003 | Shirakawa | 123/501 |
| 7,163,007 | B2 | * | 1/2007 | Sasaki et al. | 123/673 |
| 7,239,954 | B2 | * | 7/2007 | Huang | 701/103 |
| 7,562,649 | B2 | * | 7/2009 | Sarlashkar et al. | 123/478 |
| 7,831,374 | B2 | * | 11/2010 | Sasaki et al. | 701/104 |
| 8,670,918 | B2 | * | 3/2014 | Morinaga et al. | 701/103 |
| 2006/0011180 | A1 | | 1/2006 | Sasaki et al. | |
| 2009/0277259 | A1 | | 11/2009 | Sasaki et al. | |
| 2009/0306877 | A1 | | 12/2009 | Sasaki et al. | |

* cited by examiner

*Primary Examiner* — Thomas Moulis
*Assistant Examiner* — Elizabeth Hadley
(74) *Attorney, Agent, or Firm* — Grossman, Tucker et al

(57) ABSTRACT

The present disclosure provides a method to operate an internal combustion engine comprising storing a fueling command map having fueling index values, each of the fueling index values defining values for a plurality of fueling parameters, and a plurality of predetermined non-linear relationships that directly relate fueling index values to in-cylinder oxygen mass values; determining a temporary fueling index value; determining an in-cylinder oxygen mass value; identifying a predetermined relationship that directly relates fueling index values to in-cylinder oxygen mass values from the plurality of predetermined relationships to provide an identified predetermined relationship; determining that a current relationship of the temporary fueling index value to the calculated oxygen mass value differs from the identified predetermined relationship; and adjusting the temporary fueling index value using at least one fueling correction model to provide a revised fueling index value that approaches the identified predetermined relationship.

74 Claims, 18 Drawing Sheets

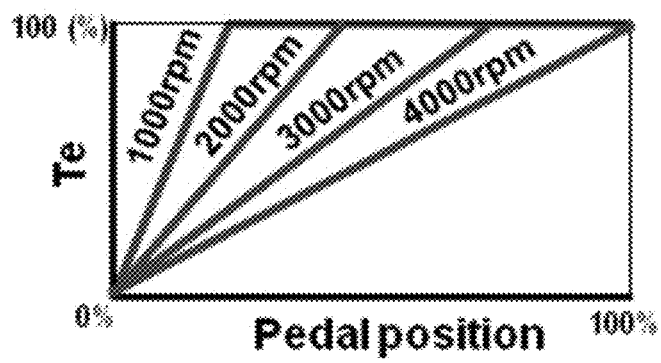

$$\left.\begin{array}{l} Q_m : \text{main injection quantity} \\ \theta_m : \text{main injection timing} \\ Q_{pp} : \text{pre-injection quantity} \\ \theta_{pp} : \text{pre-injection timing} \\ Q_a : \text{after injection quantity} \\ \theta_a : \text{after injection timing} \\ Q_{po} : \text{post injection quantity} \\ \theta_{po} : \text{post injection timing} \\ P_R : \text{Rail pressure} \\ \theta_{ig} : \text{ignition timing} \end{array}\right\}_{K,j} = Q^*(k, j) \Rightarrow T_R$$

FUELING SYSTEMS, METHODS AND APPARATUS FOR AN INTERNAL COMBUSTION ENGINE

FIELD OF THE INVENTION

The present disclosure relates to internal combustion engines, and more particularly, to improved fueling systems, methods and apparatus which may be used with a stratified charge.

BACKGROUND

A conventional four-stroke Otto cycle engine may be understood to be fueled by drawing a mixture of air and fuel (e.g. gasoline) into a combustion chamber/cylinder of the engine during an intake stroke thereof, typically through a port of an intake manifold. This may produce a homogeneous charge of the air-fuel mixture within the combustion chamber/cylinder, kept particularly close to a stoichiometric air-fuel ratio, which may be ignited by an igniter (e.g. spark plug) near the top of a compression stroke of the engine.

The air-fuel ratio may be understood as the mass ratio of air to fuel mixture introduced into the combustion chamber of an engine for combustion. When gasoline is used as a fuel, the stoichiometric air-fuel ratio is generally understood to be approximately 14.7 to 1 or, stated another way, 14.7:1. In other words, with a stoichiometric air-fuel mixture of 14.7 to 1, the air and fuel are balanced such that exactly enough air is provided to completely burn all of the fuel. If there is less air than required to maintain the stoichiometric air-fuel mixture, then there will be excess fuel left over after combustion, which may be referred to as a rich air-fuel ratio. If there is more air than required to maintain the stoichiometric air-fuel mixture, then there will be excess oxygen left over after combustion, which may be referred to as a lean air-fuel ratio. Now, while the air-fuel ratio may be commonly referred to in the trade, it should be understood that the air-fuel ratio may be more technically understood to be an oxygen-fuel ratio given that combustion is an oxidation process, and oxygen from the air is the oxidizer. However, while nitrogen and other elements in the air may not participate directly in combustion, such may have an effect on the oxidation rate.

Both a rich mixture and a lean mixture may present certain problems. Rich mixtures may produce cooler combustion gas than a stoichiometric mixture, however may have poorer fuel efficiency and increased pollution in the form of unburned hydrocarbons and carbon monoxide which may not be completely removed by the catalytic converter. Slightly lean mixtures may produce less power than the stoichiometric mixture, cooler combustion gas and increased pollution in the form of nitrogen oxides. Thus, it may often desirable to operate an internal combustion engine close to the stoichiometric air-fuel mixture. However, because a stoichiometric mixture burns relatively hot, it may damage engine components if the engine is placed under high load at this fuel air mixture. Consequently, for acceleration and high load conditions, a richer mixture (lower air-fuel ratio) may be used to produce cooler combustion products.

A homogeneous charge may be understood to provide stable combustion at a stoichiometric air-fuel ratio, but place limits on the engine's efficiency in running a lean mixture. Running at a lean mixture with a homogeneous charge may result in unstable combustion, which may lead to decreases in power and increases in hydrocarbon and carbon monoxide emissions.

In order to increase efficiency and power, fuel may be directly injected into the combustion chamber/cylinder (also known as direct fuel injection or "DFI"), as opposed to being injected from an intake port of an intake manifold (also known as port fuel injection or "PFI").

Direct fuel injection may be used to provide a homogeneous air-fuel mixture within the combustion chamber/cylinder of the engine. Direct fuel injection may also be used to provide a stratified air-fuel charge, which may be referred to as fuel stratified fuel injection or "SFI". In contrast to port fuel injection, direct fuel injection may direct fuel towards the igniter, rather than elsewhere in the combustion chamber/cylinder, which may provide a stratified charge. In other words, an air-fuel charge in which the air-fuel ratio is not homogeneous throughout the combustion chamber/cylinder, but varies across a volume of the combustion chamber/cylinder with distance from the ignitor.

Fuel injection timing may be understood to influence whether a direct injected air-fuel charge is homogeneous or stratified. For example, a homogeneous air-fuel charge may result when fuel is injected into the combustion chamber/cylinder of the engine during the intake stroke, while a stratified air-fuel charge may result when fuel is injected into the combustion chamber/cylinder of the engine during the compression stroke just before ignition.

Whether the internal combustion engine is configured to operate with a homogeneous air-fuel charge or a stratified air-fuel charge may be influenced by the operating load placed on the engine. For example, at low loads (e.g. constant or reducing speed with no acceleration), the engine may be operated with a stratified air-fuel charge, which may result in a lean burn and increased fuel economy. Alternatively, at moderate to high loads, the engine may be operated with a homogeneous air-fuel charge at near stoichiometric or slightly richer conditions.

When an Otto (e.g. gasoline) internal combustion engine is operated with a homogeneous air-fuel charge or a stratified air-fuel charge, such may be referred to as homogeneous charge spark ignition and stratified charge spark ignition, respectively.

A diesel internal combustion engine, on the other hand, may be understood to operate by stratified charge compression ignition (no ignitor or spark), where diesel fuel is injected into hot compressed (pressurized) air in the combustion chamber/cylinder of the engine during the compression stroke at the moment ignition is desired and self-ignites immediately.

SUMMARY

The present disclosure relates to internal combustion engines, and more particularly, to improved fueling systems, methods and apparatus which may be used with a stratified charge. The present disclosure describes systems, methods and apparatus to operate internal combustion engines, particularly stratified charge engines including direct injection gasoline and diesel engines, which may be particularly operated at a lean air-fuel ratio with exhaust gas recirculation (EGR).

Internal combustion engines may be operated in various control modes, depending on engine operating conditions. For example, control modes may include idle control mode (which may be identified as Mode 0), normal lean operation control mode (which may be identified as Mode 2), and normal rich operation control mode (which may be identified as Mode 3). Each of the various control modes may be understood to have different fueling considerations.

For example, in normal lean operation control mode (i.e. Mode 2), engine fueling may be model based. Fueling parameters such as fuel quantity, injection timing and injection pressure may be determined from: (1) in-cylinder condition, which may be determined (calculated) with physical models using, for example, various sensors such as airflow mass, exhaust lambda, intake lambda, intake temperature, and coolant temperature sensors; (2) engine speed; and (3) accelerator pedal position. The fueling parameters may be indexed to a parameter k, which may be referred to as a fueling index k, so that a particular (single) value of the fueling index k defines all of the fueling parameters. The fueling index k may also be used to estimate the actual engine torque (defined as the torque representative TR).

The fueling index k value may be temporarily determined by accelerator pedal position. Then, the fueling index k value may be revised using a predetermined fueling correction model. Selection of the fueling correction model may be dependent upon whether the engine is in an operating condition in which: (1) fuel injection quantity drives in-cylinder oxygen mass O2 or, stated another way, in-cylinder oxygen mass O2 is driven by fuel injection quantity, or (2) fuel injection quantity is driven by in-cylinder oxygen mass O2 or, stated another way, in-cylinder oxygen mass O2 drives fuel injection quantity.

In one embodiment, the present disclosure provides a method to operate an internal combustion engine comprising storing a fueling command map having fueling index values, each of the fueling index values defining values for a plurality of fueling parameters, and a plurality of predetermined non-linear relationships that directly relate fueling index values to in-cylinder oxygen mass values; determining a temporary fueling index value; determining an in-cylinder oxygen mass value; identifying a predetermined relationship that directly relates fueling index values to in-cylinder oxygen mass values from the plurality of predetermined relationships to provide an identified predetermined relationship; determining that a current relationship of the temporary fueling index value to the calculated oxygen mass value differs from the identified predetermined relationship; and adjusting the temporary fueling index value using at least one fueling correction model to provide a revised fueling index value that approaches the identified predetermined relationship.

In another embodiment, the present disclosure providers a method to operate an internal combustion engine of a motor vehicle, the method comprising storing a fueling command map having fueling index values, each of the fueling index values defining values for a plurality of fueling parameters, and a plurality of predetermined non-linear relationships that directly relate fueling index values to in-cylinder oxygen mass values; during an operation of the engine, receiving engine operating values representing accelerator pedal position, intake airflow mass, a concentration of oxygen in an intake charge and a concentration of oxygen in exhaust gas; determining a temporary fueling index value, wherein the temporary fueling index value is determined from at least one of the engine operating values representing the accelerator pedal position and a previous combustion cycle of the engine; determining an in-cylinder oxygen mass value, wherein the oxygen mass value is calculated at least in part from the engine operating values representing the intake airflow mass, the concentration of oxygen in the intake charge and the concentration of oxygen in the exhaust gas; identifying a predetermined relationship that directly relates fueling index values to in-cylinder oxygen mass values from the plurality of predetermined relationships to provide an identified predetermined relationship; determining that a current relationship of the temporary fueling index value to the calculated oxygen mass value differs from the identified predetermined relationship; adjusting the temporary fueling index value using at least one fueling correction model to provide a revised fueling index value that approaches the identified predetermined relationship; and using the revised fueling index value to determine values for a plurality of fueling parameters.

FIGURES

The above-mentioned and other features of this disclosure, and the manner of attaining them, will become more apparent and better understood by reference to the following description of embodiments described herein taken in conjunction with the accompanying drawings, wherein:

FIG. 2 illustrates certain fueling and ignition parameters Q* may be packaged and indexed by indexes k and j;

FIG. 5 illustrates an exemplary relationship between expected torque TE (y-axis) versus accelerator pedal position P (x-axis) at various engine speeds;

Figure 12:
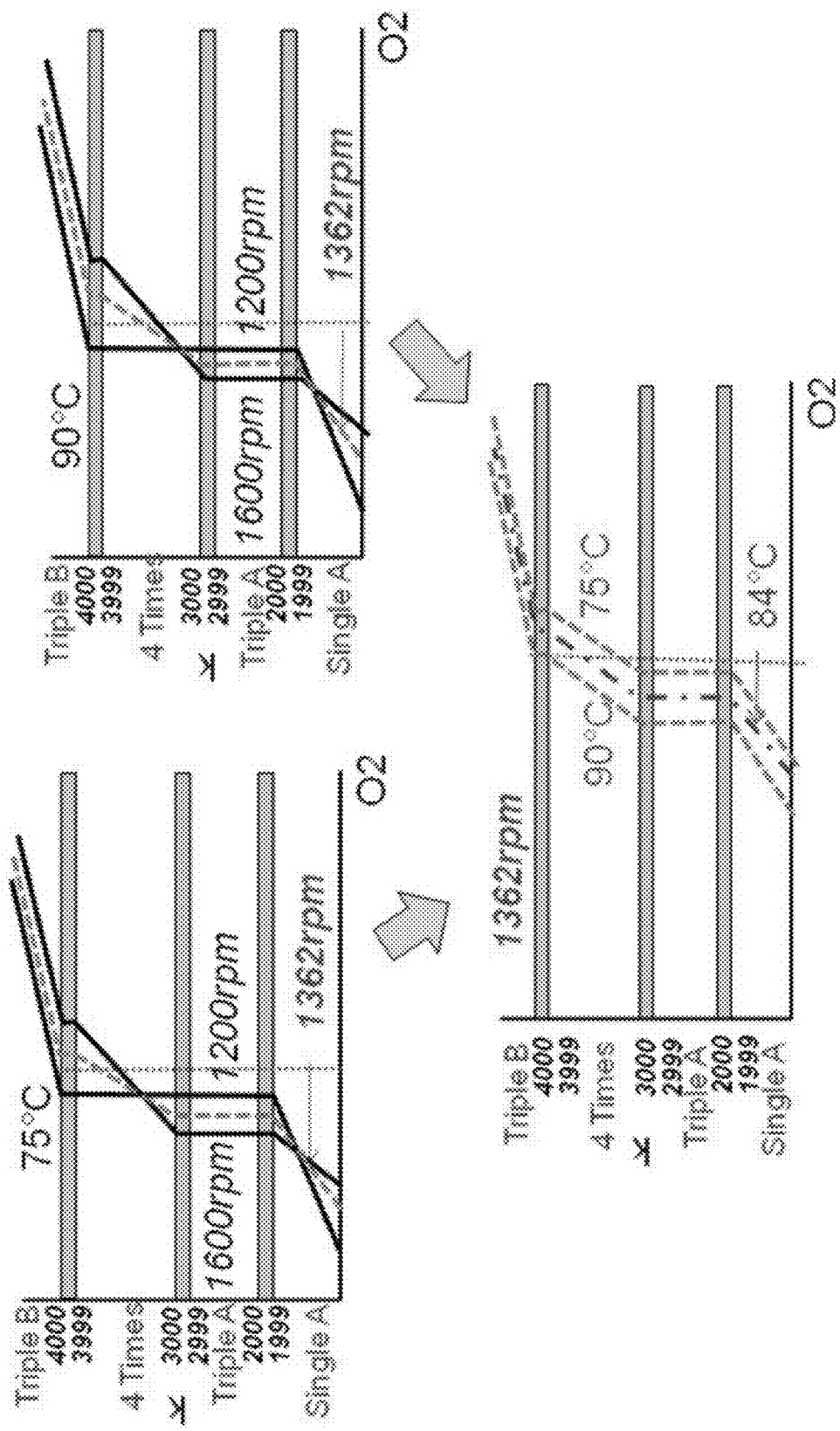
Figure 13:
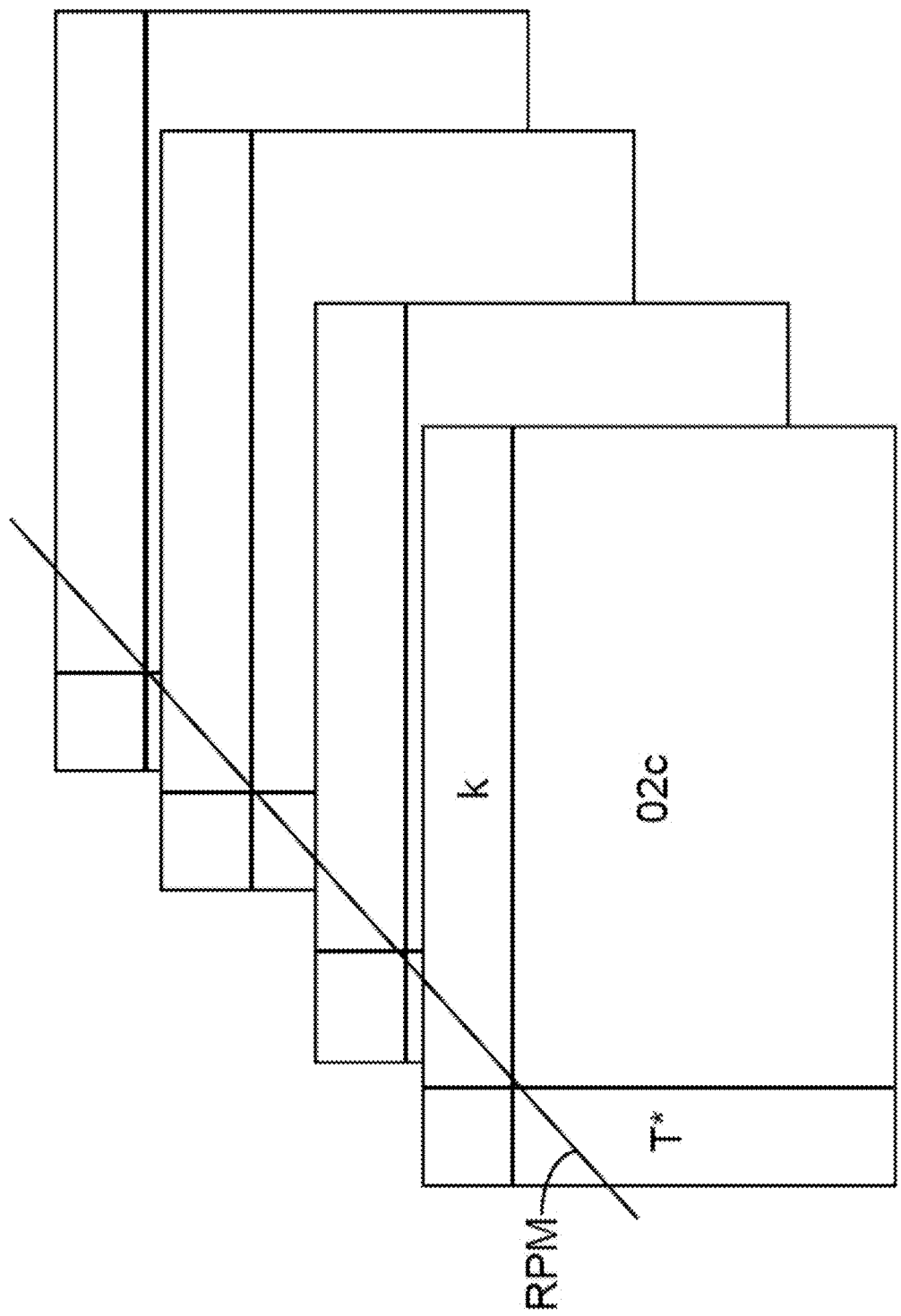
Figure 14:
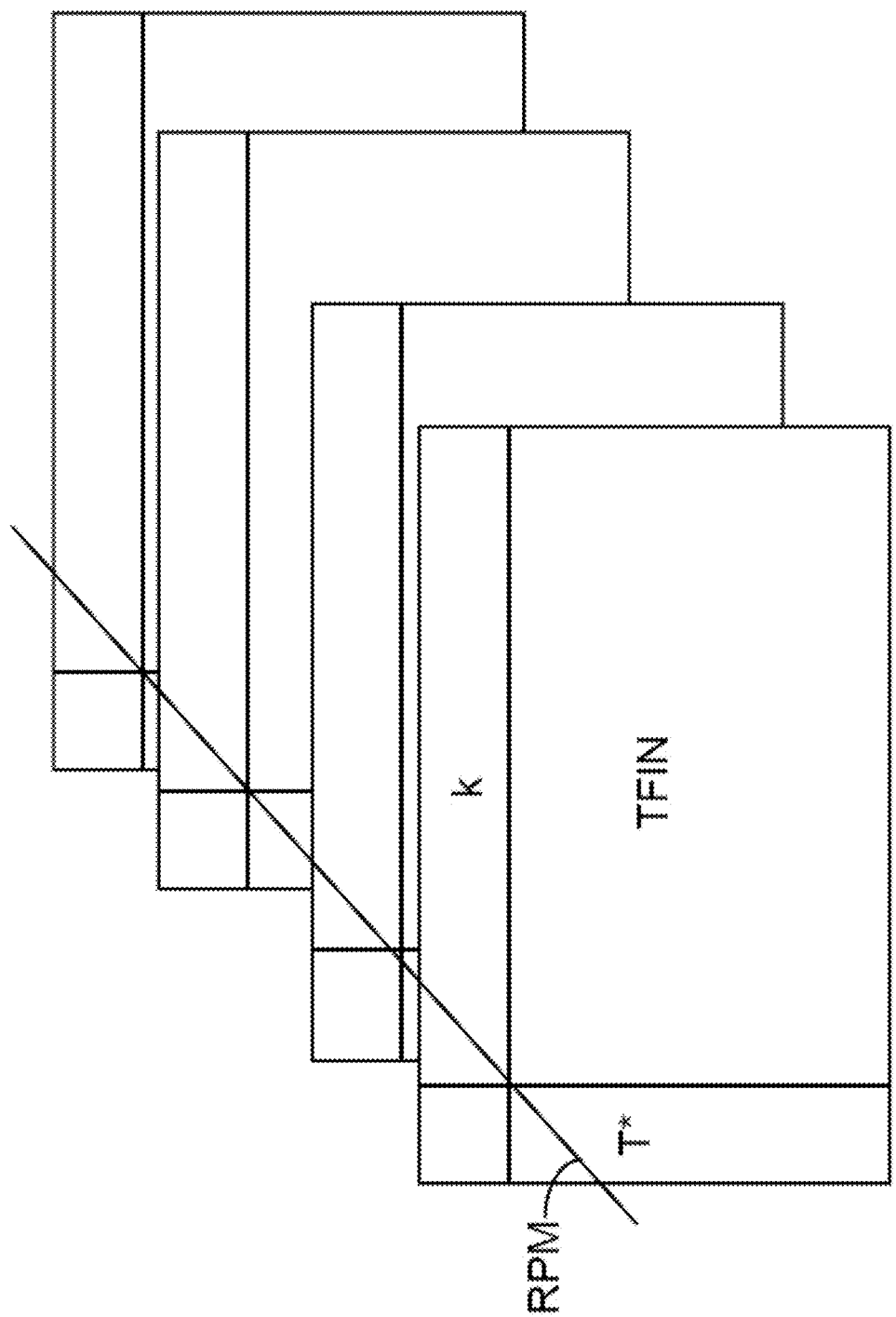
Figure 15:
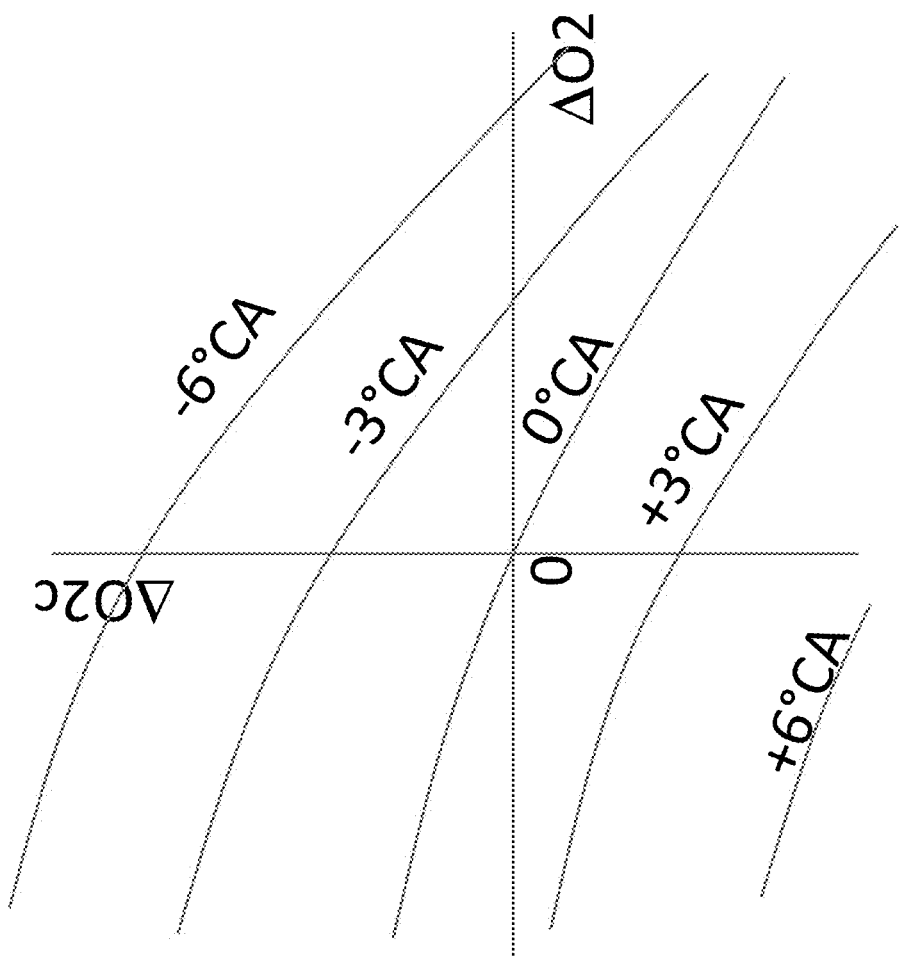
Figure 16:
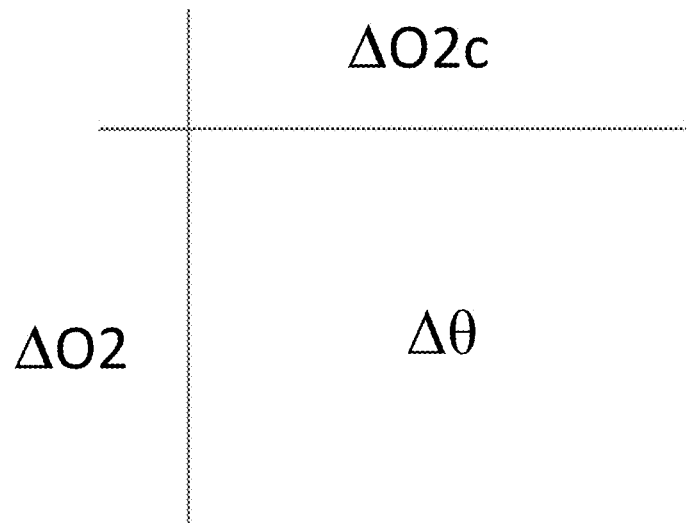
Figure 17:
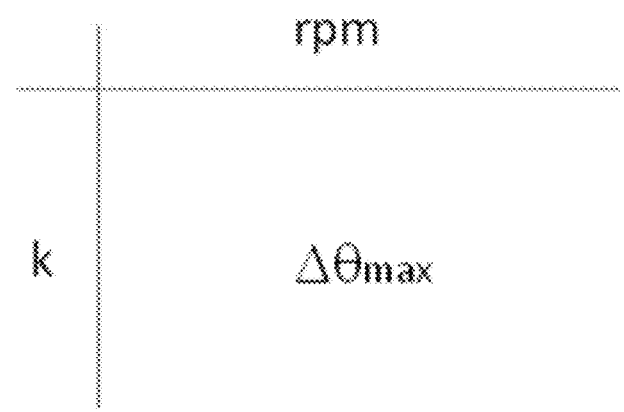
Figure 18:
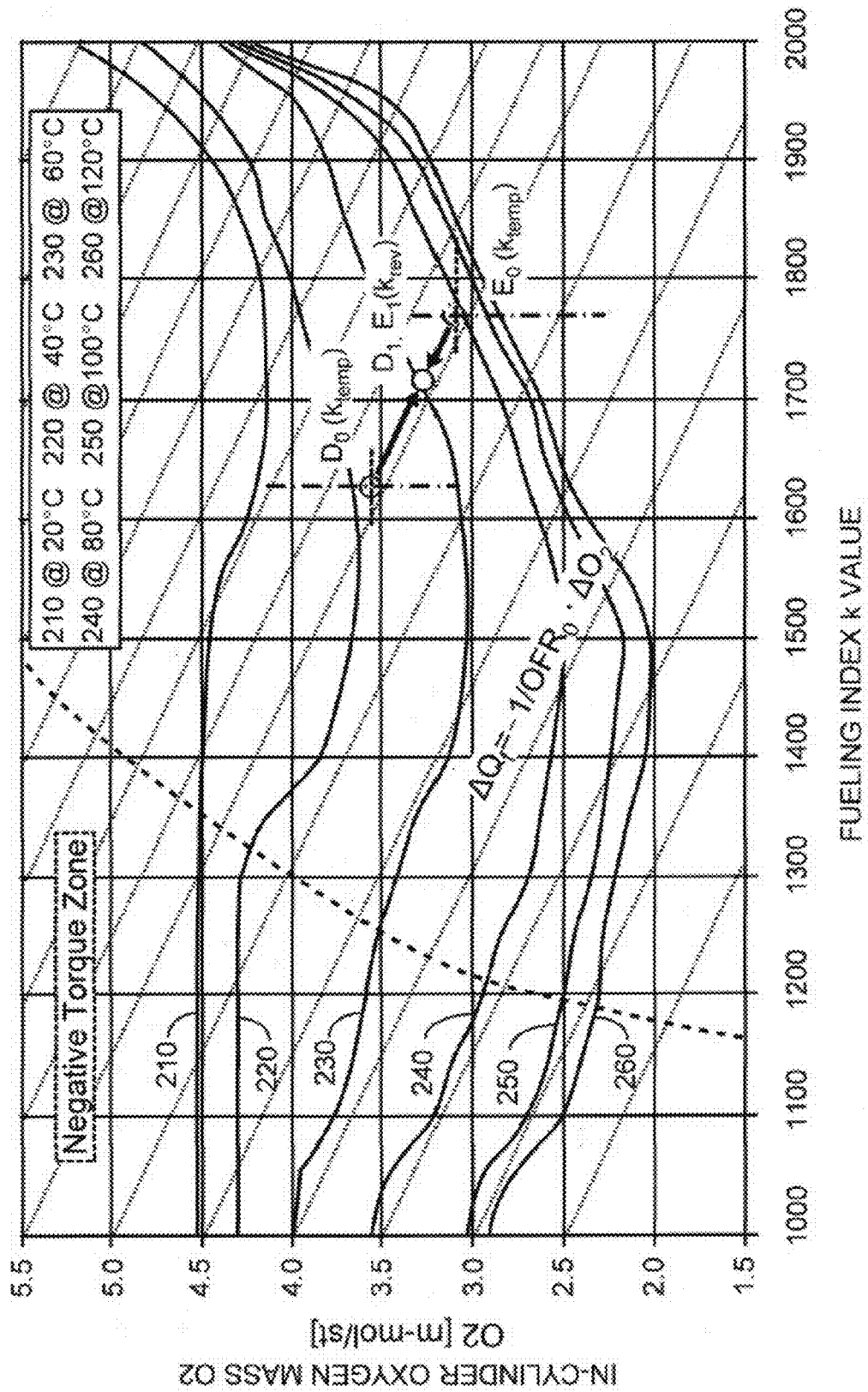
Figure 19:
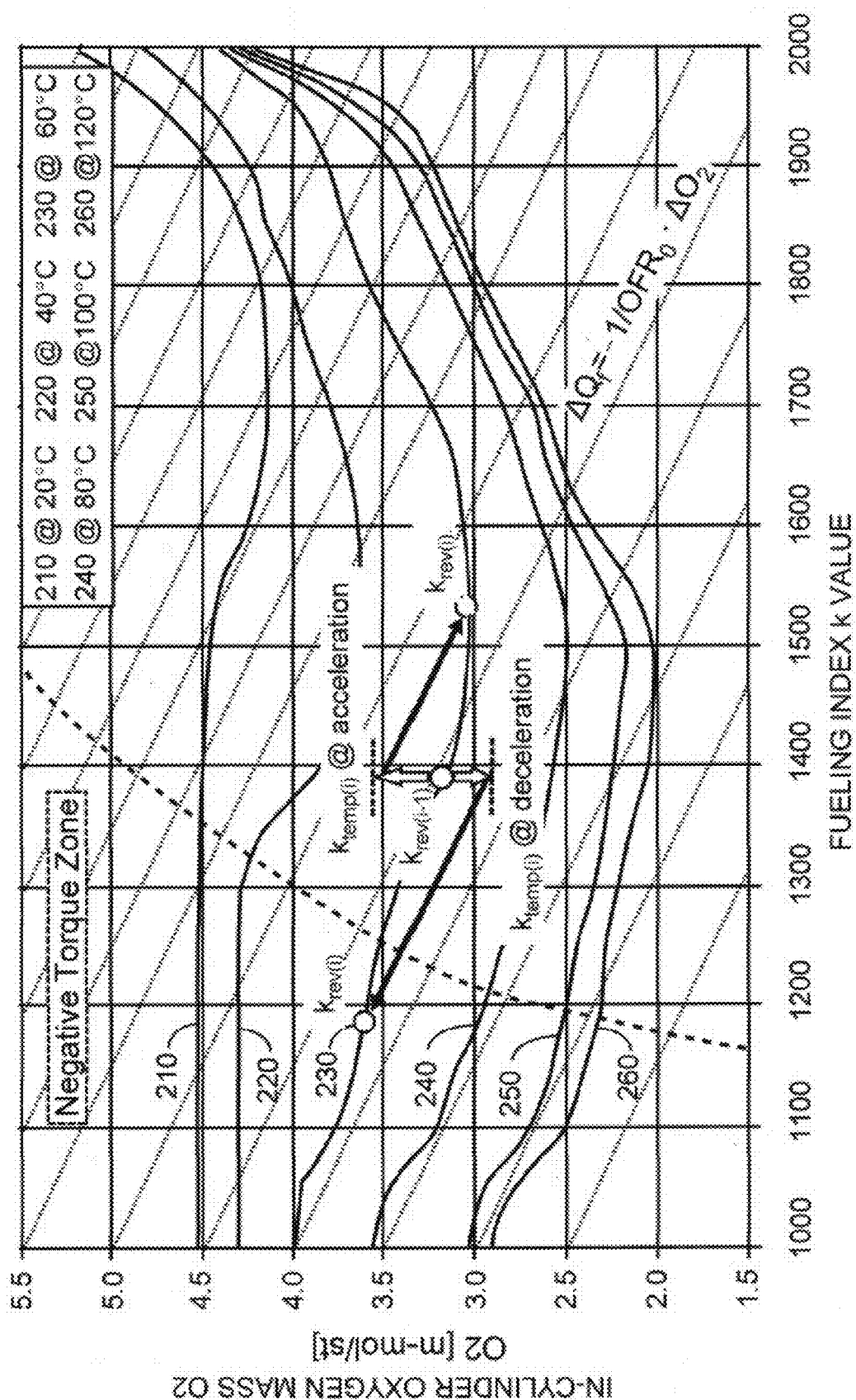

FIG. 12 illustrates fueling index k value (y-axis) versus in-cylinder oxygen mass O2 (x-axis) for various engine speeds rpm at predetermined engine temperature values of 75° C. and 90° C. and determination of the fueling index k value between 75° C. and 90° C.;

FIG. 13 illustrates a three-dimensional map comprising tables which map predetermined engine temperature values, fueling index k values and engine speed rpm to intake oxygen concentration O2c values;

FIG. 14 illustrates a three-dimensional map comprising tables which map predetermined engine temperature values, fueling index k values and engine speed rpm to fuel injection timing TFIN values;

FIG. 15 illustrates the effect of intake oxygen concentration deviation ΔO2c and in-cylinder oxygen mass deviation ΔO2 on fuel injection timing (crank angle) offset;

FIG. 16 illustrates a two-dimensional map comprising tables which map in-cylinder oxygen mass O2 deviation values and intake oxygen concentration deviation ΔO2c values to injection timing offset Δθ values;

FIG. 17 illustrates a two-dimensional map comprising tables which map fueling index k values and engine speed rpm to maximum injection timing offset Δθmax values;

FIG. 18 illustrates an exemplary relationship for in-cylinder oxygen mass O2 (y-axis) versus fueling index k value (x-axis) at various predetermined engine temperature values and application of a fueling correction model according to another embodiment of the disclosure; and FIG. 19 illustrates an exemplary relationship for in-cylinder oxygen mass O2 (y-axis) versus fueling index k value (x-axis) at various predetermined engine temperature values and application of a fueling correction model according to another embodiment of the disclosure.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

The following disclosure relates to internal combustion engines, and more particularly, to improved fueling systems, methods and apparatus which may be used with a stratified charge. The following disclosure describes systems, methods and apparatus to operate internal combustion engines, particularly stratified charge engines including direct injection gasoline and diesel engines, which may be particularly operated at a lean air-fuel ratio with exhaust gas recirculation (EGR).

With EGR, exhaust gas expelled from the cylinders of an internal combustion engine may be collected in a collector of an exhaust manifold. A fraction of the collected exhaust gas may then be routed from the exhaust manifold through a control valve back to an intake manifold of the engine, where it may be introduced to a stream of ambient air-fuel mixture. EGR may affect combustion in several ways. Notably, the combustion may be cooled by the presence of exhaust gas, that is, the recirculated exhaust gas may absorb heat of combustion. The dilution of the oxygen present in the combustion chamber with the exhaust gas, in combination with the cooler combustion, may reduce the production of nitrogen oxides ($NO_x$).

Figure 1:
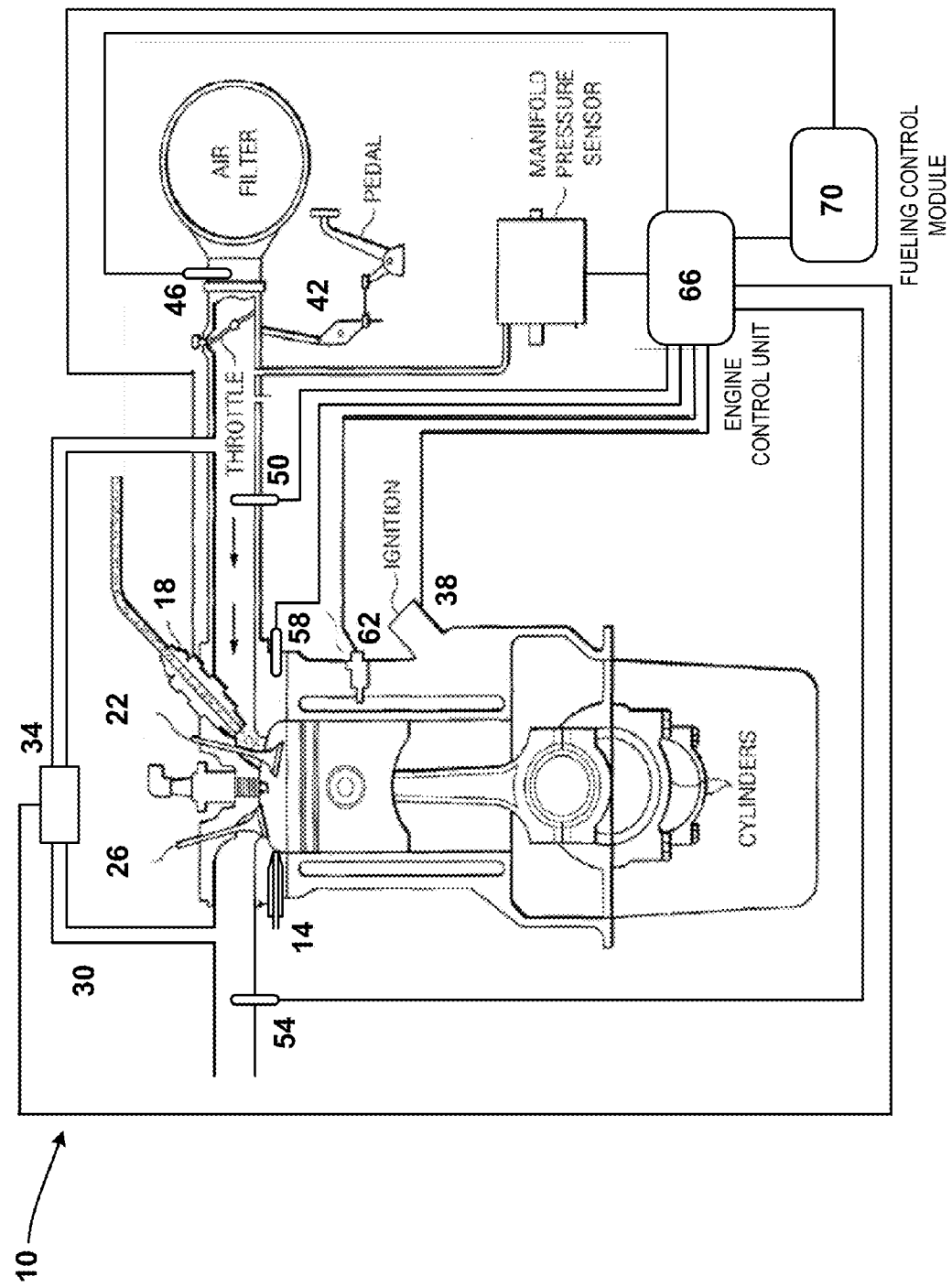
FIG. 1 illustrates an exemplary engine having a fueling control module which may operate in accordance with the methods disclosed herein.

Referring now to the figures, FIG. 1 illustrates an internal combustion engine 10 with which the systems, methods and apparatus described herein may be used. Engine 10 may include fuel injectors, which may include fuel injectors 14 for direct injection (i.e. an injector which injects directly into the cylinder/combustion chamber, which may be referred to as a direct fuel injector) or fuel injectors 18 for indirect injection (i.e. an injector which does not inject directly into the cylinder/combustion chamber, but rather generally before the intake valve 22 such as with intake port injection). Engine 10 may also include an EGR (exhaust gas recirculation) loop 30 and EGR valve 34 as known in the art. Engine 10 may also include sensors for acquiring various input values relevant to the present disclosure, such as sensors configured to acquire input values representative of engine speed 38, accelerator pedal position 42, intake airflow mass 46, concentration of oxygen in the intake charge 50, concentration of oxygen in the exhaust gas 54, intake manifold temperature 58, and coolant temperature 62. The various sensors may be suitably configured and arranged to perform their specific functions, including providing suitable signals as known by one of ordinary skill in the art.

Engine 10 may further include an engine control unit (ECU) 66 and a separate fueling control module 70. Either may be programmed to receive and process signals from the various sensors, and control various fueling parameters in accordance with the present disclosure. Either engine control unit 66 or fueling control module 70 may be a processor based unit including appropriate software and hardware, such as computer processing and memory devices, and the memory thereof may store maps of known values to fueling parameters for access during operation of engine 10. Fueling control module 70 may be integrated with or part of a comprehensive engine controller, such as an engine control unit (ECU) 66.

With the present disclosure, fueling parameters for internal combustion engine 10, such as fuel quantity, timing and pressure, may be particularly defined using a unit-less fueling index k as described in greater detail below. The unit-less fuel index values, or k values, may be established from empirical test data. For example, fueling parameters for engine 10 may be established which better optimize engine performance for a particular set of engine operating conditions (e.g. steady state conditions), while at the same time balancing a need to inhibit production of certain undesirable combustion by-products, such as unburnt hydrocarbons or nitrogen oxides.

Since the production of combustion by-products, such as unburnt hydrocarbons or nitrogen oxides, may be understood to be a function of the air-to-fuel ratio in a cylinder of the engine 10, fueling parameters for a particular set of engine operating conditions may be established to achieve a particular air-to-fuel ratio, particularly taking into consideration the mass of oxygen in the cylinder of the engine 10. Once the fueling parameters for a particular set of engine operating conditions are established taking into account, among other things, the mass of oxygen in the cylinder of the engine, a fueling index k value may be assigned to the given set of fueling parameters, thus defining values for a plurality of fueling parameters. The fueling index k values may then be stored in the fueling control module 25, such as part of a fueling map.

By way of example, as shown in FIG. 2, certain fueling parameters Q*, such as for fuel injection quantity, timing and pressure (and ignition timing in the case of a gasoline engine) may be packaged and indexed by indexes k and j, with the index k being related to torque and the index j being related to engine speed. Once the indexes k and j are defined, fueling parameters Q* are defined and the actual engine torque may be estimated, which may be referred to herein as the torque representative TR. The fueling index k may be particularly defined as to have values which monotonically increase with increasing torque (FIG. 4A), and the fueling parameter of fuel quantity $Q_f$ may be particularly defined as to have values which monotonically increase with increasing fueling index k values (FIG. 4B). A methodology for use of fueling index k will now be discussed in greater detail.

Figure 3:
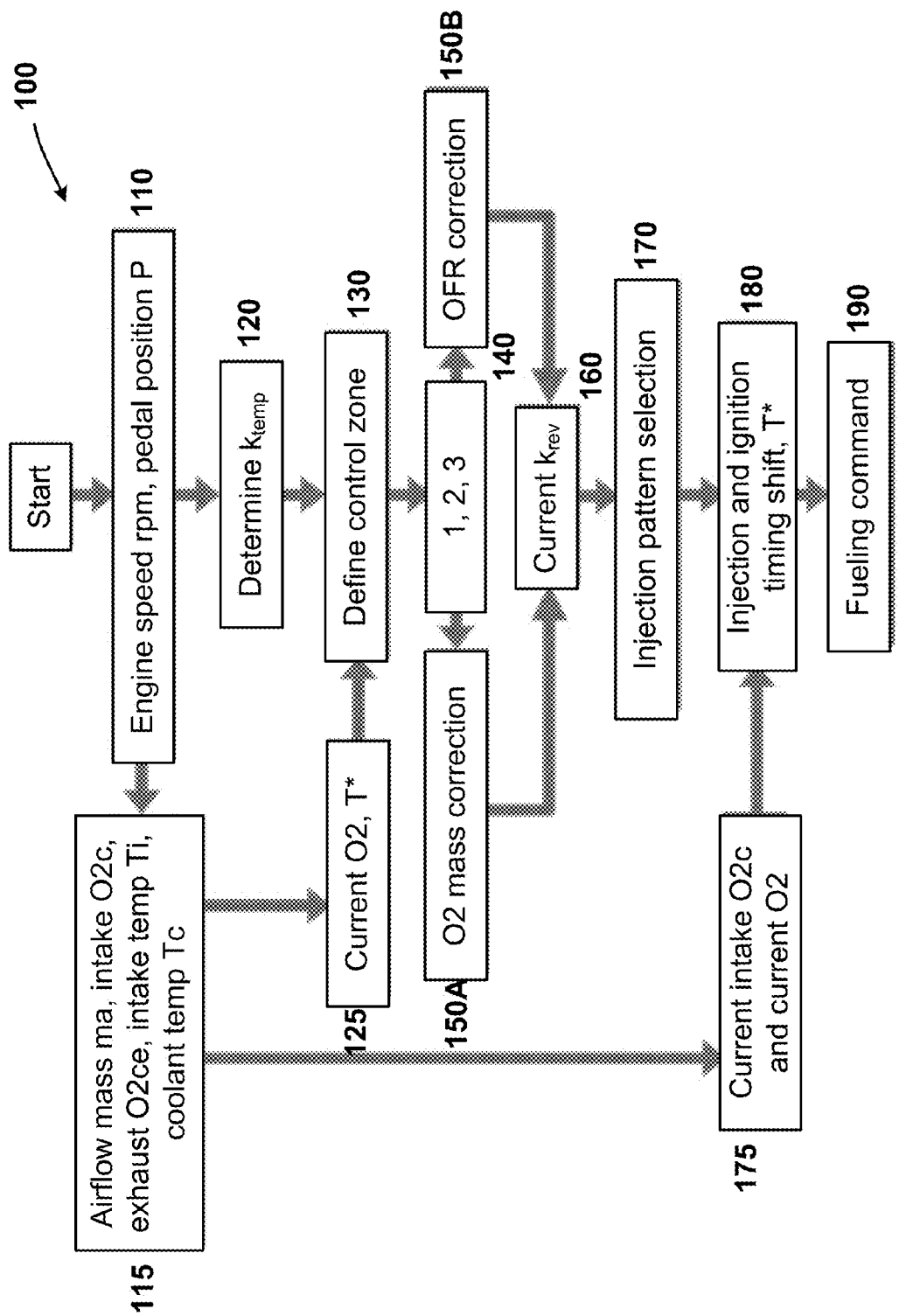
FIG. 3 illustrates an exemplary flow chart to operate an internal combustion engine of a motor vehicle, particularly by improved control of the fueling process to provide improved combustion.

Turning to FIG. 3, there is illustrated an exemplary process control flow chart 100 to control fueling and subsequent combustion in an internal combustion engine of a motor vehicle, particularly by improved control of the fueling process. Each of the operations will now be briefly discussed, and then each operation will be discussed in greater detail.

When engine 10 is started, fueling control module 25 may receive from various sensors, as shown at reference characters 110 and 115, engine operating values which may represent, among others, engine speed rpm, accelerator pedal position P, intake airflow mass ma, a concentration of oxygen in an intake charge O2c, a concentration of oxygen in exhaust gas O2ce, engine intake manifold temperature Ti, and engine coolant temperature Tc.

From engine speed rpm and pedal position P, a predetermined temporary (pedal-based) fueling index $k_{temp}$ 120 value may be determined from a fueling map, which may be used to determine temporary fueling parameters such as fuel quantity $Q_f$. The predetermined temporary (pedal-based) fueling index $k_{temp}$ 120 value may be determined after engine start-up.

From an intake manifold temperature sensor, (voltage) signals may be used to determine an intake manifold temperature Ti, and from a coolant temperature sensor (voltage) signals to determine a coolant temperature Tc. From Ti and Tc, an engine temperature 125, such as representative T*, may be calculated to provide a temperature representative of current engine operating temperature).

From a mass airflow sensor, (voltage) signals may be used to determine intake airflow mass ma; from an intake lambda sensor, (voltage) signals may be used to determine a concentration of oxygen in an intake charge O2c (which may also be referred to as intake oxygen concentration O2c); and from an exhaust lambda sensor, (voltage) signals may be used to determine a concentration of oxygen in exhaust gas O2ce (which may also be referred to as exhaust oxygen concentration O2ce). From ma, O2c and O2ce, current in-cylinder oxygen mass O2 may be calculated 125. In other words, the mass of oxygen which may be expected in a given cylinder of the engine 10.

From the engine temperature T* and in-cylinder oxygen mass O2 at the current engine speed rpm and predetermined temporary $k_{temp}$ value, an appropriate control zone 130 may be determined 140, which may then be used to determine a fueling correction model 150A, 150B. Depending on pedal direction (i.e. acceleration or deceleration) and the particular control zone, an oxygen-to-fuel ratio OFR or an in-cylinder oxygen mass O2 correction model/method for revision of the temporary $k_{temp}$ value may be selected and applied.

Based on the revised $k_{rev}$ value 160, an injection pattern 170 may then be determined. Thereafter, comparing the current intake oxygen concentration O2c 175 with the desired intake oxygen concentration O2c at the same k value and engine temperature T*, as well as comparing the current in-cylinder oxygen mass O2 with the desired in-cylinder oxygen mass at the same k value and engine temperature T*, fuel injection timing may be shifted 180 to compensate for the effect of deviation from steady state relations caused by EGR delay and/or turbo lag. Thereafter, all fueling parameters are determined and may be commanded 190. The various operations of FIG. 3 will now be discussed in greater detail.

As indicated above, once the control module 25 has received the signals from sensors representative of engine speed rpm and pedal position P, the temporary fueling index $k_{temp}$ value may be determined from a fueling map. In certain embodiments, the temporary fueling index $k_{temp}$ value may be predetermined solely from accelerator pedal position P at a given engine speed rpm and hence, in this embodiment, may be also referred to as a pedal-based k value. As discussed below, in alternative embodiments, the temporary fueling index $k_{temp}$ value may also be determined from a previous combustion cycle of engine 10, such as the combustion cycle of the cylinder most recently to have undergone combustion therein).

Figure 4A:
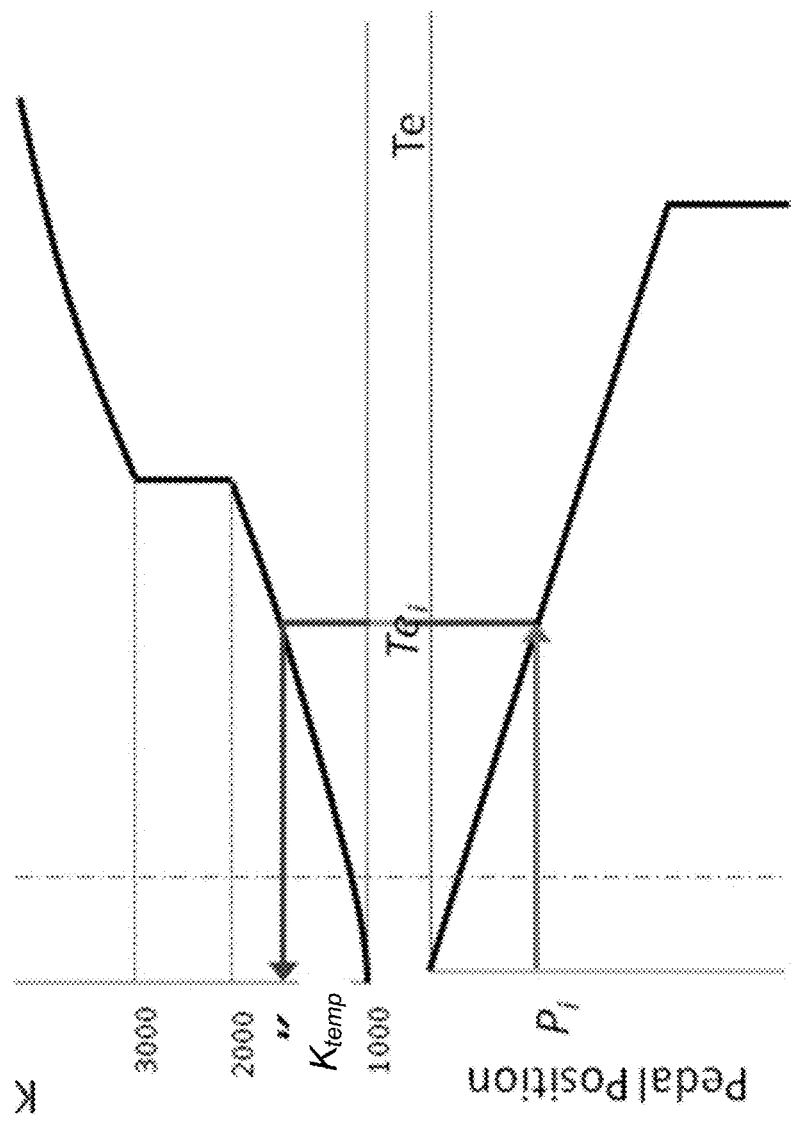
FIG. 4A illustrates a methodology to determine a temporary fueling index $k_{temp}$ value from pedal position P and expected torque TE.
Figure 4B:
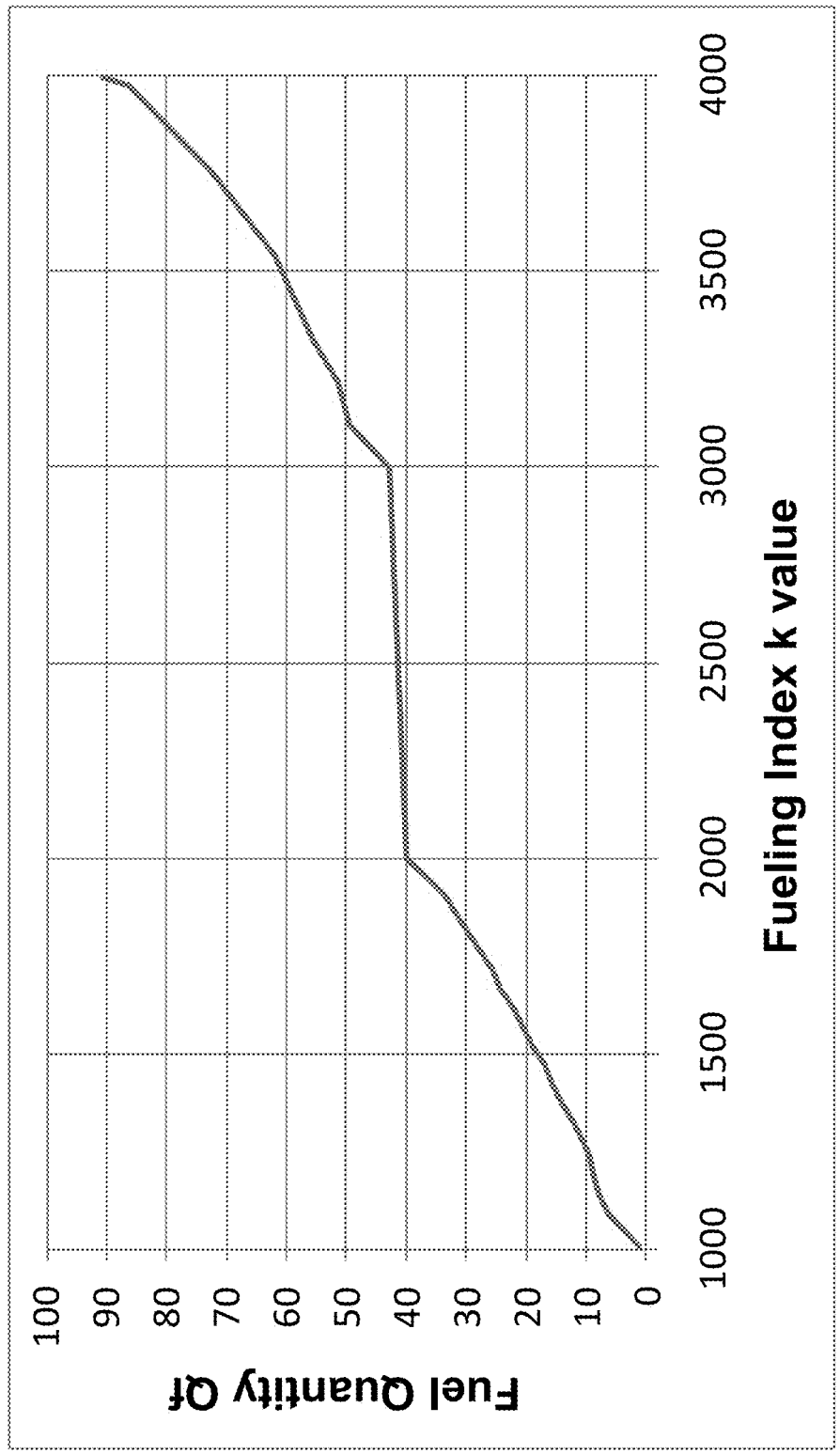
FIG. 4B illustrates a methodology to determine fuel quantity $Q_f$ from a fueling index k value.

Referring now to FIG. 4A, there is shown a graph of expected torque TE value which may be determined from pedal position P representative for a particular engine speed rpm. Air-handling actuators may be controlled directly by pedal position P to achieve the in-cylinder condition needed to provide the expected torque TE by the driver.

FIG. 5 shows relationships between pedal position P and expected torque TE value at various engine speeds. The relation between pedal position P and expected torque TE may be defined considering drivability aspects and therefore depends on engine speed rpm.

The relation between pedal position P and expected torque TE value may be defined from a steady-state map. Stated another way, the expected torque TE may be understood as the steady-state torque at a given pedal position P. The expected torque TE may be understood to differ from the torque representative TR estimated from actual fueling especially during transient operation.

Returning briefly to FIG. 4A, FIG. 4A further illustrates a graph of temporary fueling index $k_{temp}$ value which may be determined from the expected torque TE value. Thus, at the current cycle, expected torque TE value may be determined from the current pedal position P and temporary fueling index $k_{temp}$ value may be determined from expected torque TE value. As shown in FIG. 4B, the temporary fueling index $k_{temp}$ value may be used to determine a temporary fuel quantity $Q_f$.

In addition to determining a temporary fueling index $k_{temp}$ value from sensor signals representative of engine speed rpm and pedal position P, sensor signals representative of engine intake manifold temperature Ti, and engine coolant temperature Tc may be used to determine an engine temperature T* value.

The engine temperature T* value may be calculated from the intake manifold temperature Ti value and engine coolant temperature Tc value, and more particularly may be a function of engine intake temperature Ti and engine coolant temperature Tc which may be represented as T*=f(Ti, Tc). This function is an empirical function which may be simply defined as follows (where the effective factors A and B may be functions of engine speed rpm and fueling index k value and are defined from steady-state):

$$T^* = (A \times Ti) + (B \times Tc)$$

In addition to determining the engine temperature T* value from sensor signals representative of intake manifold temperature Ti and engine coolant temperature Tc, sensor signals representative of intake airflow mass ma, a concentration of oxygen in an intake charge O2c, a concentration of oxygen in exhaust gas O2ce may be used to determine an in-cylinder oxygen mass O2 value. In other words, the mass of oxygen which may be expected in a given cylinder of the engine 10.

The in-cylinder oxygen mass O2 value may be calculated as follows:

$$O2_i = \left(0.211 + \frac{0.211 - O2c_i}{O2c_i - O2ce_{i-n}} \times O2ce_{i-n}\right) \times (ma_i)$$

where the intake airflow mass ma; and the oxygen concentration $O2c_i$ are current values, while the exhaust oxygen concentration $O2ce_{i-n}$ includes a certain time delay depending on the EGR path volume. This time delay can be estimated by a physical model specified for the EGR system (with sensor) configuration.

Thus, in light of the foregoing, a temporary fueling index $k_{temp}$ value, an engine temperature T* value and an in-cylinder oxygen mass O2 value have now been determined.

Figure 6:
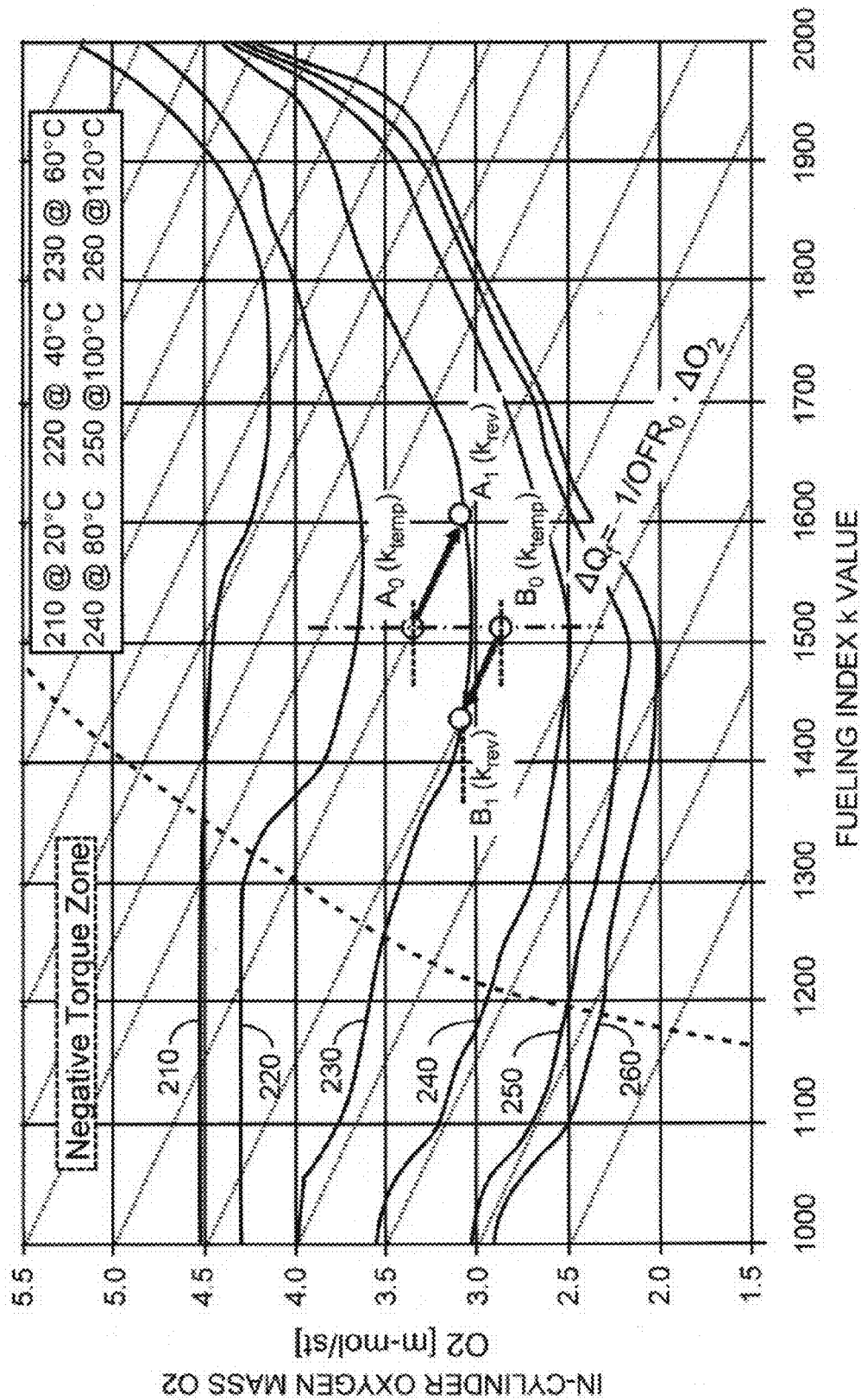
FIG. 6 illustrates exemplary relationships for in-cylinder oxygen mass O2 (y-axis) versus fueling index k value (x-axis) at various predetermined engine temperatures and application of a first fueling correction model.

Referring now to FIG. 6, there is shown a graph, at a particular engine speed, including exemplary predetermined relationships for in-cylinder oxygen mass O2 value (y-axis) versus fueling index k value (x-axis) at various predetermined engine temperature T* values.

More particularly, FIG. 6 shows a plurality of functional predetermined (non-linear) relationships that directly relate fueling index k values and in-cylinder oxygen mass O2 values (in a one-to-one relationship) at a particular engine speed. As shown each of the relationships 210, 220, 230, 240, 250 and 260 corresponds to a different predetermined engine temperature T*value (i.e. 20° C., 40° C., 60° C., 80° C., 100° C. and 120° C., respectively).

While the predetermined relationships are provided at only six predetermined engine temperature T* values, which are separated by increments of 20° C., it should be understood that the stored maps may include more predetermined engine temperature T* values of which may ordinary be encountered during operation of the engine 10 such as, for example, in increments of a single degree Celsius up to 20 degrees Celsius over a range of, for example, −40° C. to 115° C.

Furthermore, as discussed in greater detail below, when a stored map does not include a predetermined relationship that directly relates fueling index k values and in-cylinder oxygen mass O2 values at a particular predetermined engine temperature T*, linear interpolation may be used to identify such a predetermined relationship at the particular engine temperature T*. In other words, for example, if engine 10 is at a temperature of 70° C., and the nearest above and below stored relationships are at 80° C. (i.e. 240) and 60° C. (i.e. 230), control module 25 may be programmed to create a predetermined relationship at 70° C. by interpolation using selected relationships 230 and 240 at 60° C. and 80° C., respectively.

In similar fashion, control module 25 may be programmed to create a predetermined relationship when a stored map does not include a predetermined relationship at a particular engine speed rpm. Furthermore, control module 25 may be programmed to create a predetermined relationship when a stored map does not include a predetermined relationship at a particular engine speed rpm and engine temperature by a two step interpolation.

Thus, it should be understood that a predetermined relationship that directly relates fueling index k values and in-cylinder oxygen mass O2 values at a particular engine temperature and speed may either be selected from a plurality of stored predetermined relationships, or if unavailable at the particular engine temperature and/or engine speed, may be created from the plurality of stored predetermined relationships, such as by (linear) interpolation.

The temporary fueling index $k_{temp}$ value, the in-cylinder oxygen mass O2 value, and the engine temperature T* value determined above may now be used to identify a particular point on FIG. 6. For the current example, the current (actual) engine temperature T* value may be understood to be equal to one of the shown predetermined engine temperature T* values, here 60° C., which corresponds to predetermined relationship 230.

If the current relationship of the temporary fueling index $k_{temp}$ value to the calculated in-cylinder oxygen mass O2 value is the same as the predetermined relationship 230, then the relationship is already at predetermined optimum and no future correction may be required. However, if the current relationship of the temporary fueling index $k_{temp}$ value to the calculated in-cylinder oxygen mass O2 value differs from the predetermined relationship 230, then one of a plurality of fueling correction models may be used to revise the temporary fueling index $k_{temp}$ value, such that a revised relationship of the revised fueling index $k_{rev}$ value to the in-cylinder oxygen mass value O2 approaches the predetermined relationship 230.

The relationship of the temporary fueling index $k_{temp}$ value to the calculated in-cylinder oxygen mass O2 value may differ from the predetermined relationship 230 particularly during transient conditions. During transient conditions, the actual intake airflow and/or exhaust gas recirculation (EGR) flow may be delayed by turbo lag and/or EGR delay, and the in-cylinder oxygen mass O2 may be different than the steady-state condition. Consequently, the temporary fueling index $k_{temp}$ value from pedal position P may not be suitable for optimal combustion and may be revised with the correction methods discussed below.

For example, referring to FIG. 6, Point $A_0$ is shown to be a point which differs from the predetermined relationship 230 for in-cylinder oxygen mass O2 value (y-axis) versus fueling index k value (x-axis). In other words, Point $A_0$ is not located on line 230. More particularly, as shown, Point $A_0$ has an in-cylinder oxygen mass O2 value which is higher or greater than the predetermined in-cylinder oxygen mass O2 value for the corresponding temporary fueling index $k_{temp}$ value of the predetermined relationship 230.

Thus, the current relationship of the temporary fueling index $k_{temp}$ value to the calculated in-cylinder oxygen mass O2 value differs from the predetermined relationship 230, and the temporary fueling index $k_{temp}$ value may now be revised with one of a plurality of fueling correction models, such that the revised relationship of the fueling index k value to the in-cylinder oxygen mass O2 value approaches the predetermined relationship 230 with use of a revised fueling index $k_{rev}$ value.

Selection of the suitable fueling correction model may be dependent upon whether the engine is in an operating condition in which: (1) fuel injection quantity $Q_f$ drives in-cylinder oxygen mass O2 or, stated another way, in-cylinder oxygen mass O2 is driven by fuel injection quantity $Q_f$, or (2) fuel injection quantity $Q_f$ is driven by in-cylinder oxygen mass O2 or, stated another way, in-cylinder oxygen mass O2 drives fuel injection quantity $Q_f$.

More particularly, an oxygen-to-fuel ratio OFR correction model may be used when fuel injection quantity $Q_f$ drives in-cylinder oxygen mass O2, and an in-cylinder oxygen mass O2 correction model may be used when in-cylinder oxygen mass O2 drives fuel injection quantity $Q_f$. Oxygen-to-fuel ratio OFR or in-cylinder oxygen mass O2 correction may be determined at each combustion cycle.

Figure 7:
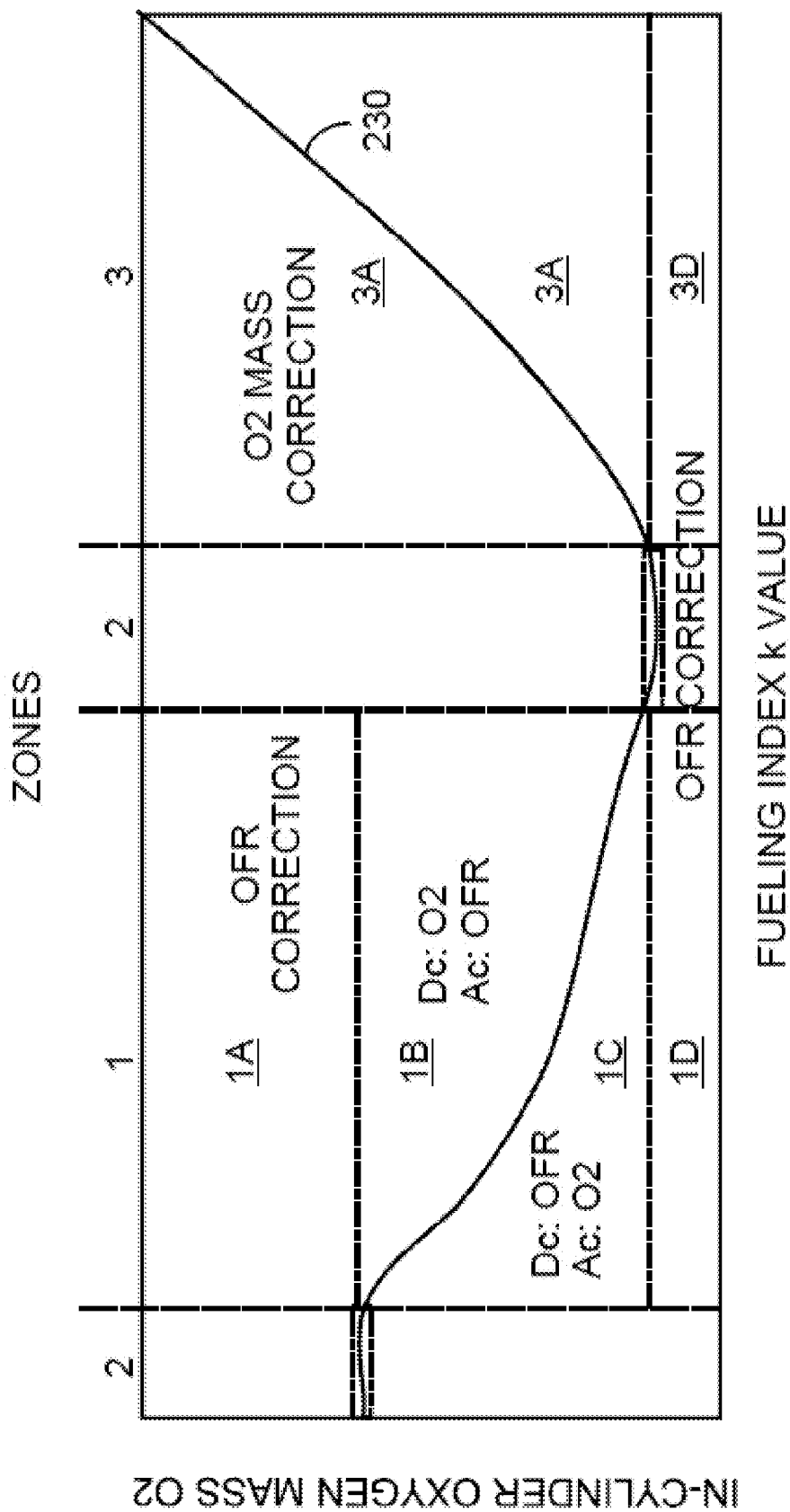
FIG. 7 illustrates various control zones 1, 2 and 3 determined from in-cylinder oxygen mass O2 value (y-axis) versus fueling index k value (x-axis) during steady state.

Referring now briefly to FIG. 7, the determination as to which fueling correction model to utilize may be dependent upon which control zone of the predetermined non-linear relationship 230 the temporary fueling index $k_{temp}$ falls within. As shown, the predetermined non-linear relationship 230 of FIG. 7 that directly relates fueling index k values to in-cylinder oxygen mass O2 values may be divided into a plurality of control zones.

As shown, in control zone 1 of the predetermined relationship 230, the in-cylinder oxygen mass O2 values decrease as the fueling index k values increase. More particularly, in control zone 1 of the predetermined relationship 230, the in-cylinder oxygen mass O2 values may decrease strictly monotonically as the fueling index k values increase.

In control zone 2 of the predetermined relationship 230, the in-cylinder oxygen mass O2 values remain substantially constant as the fueling index k values increase, and in-cylinder oxygen mass O2 value may not be used to determine the fueling index k value.

In control zone 3 of the predetermined relationship 230, the in-cylinder oxygen mass O2 values increase as the fueling index k values increase. More particularly, in control zone 3 of the predetermined relationship 230, the in-cylinder oxygen mass O2 values may increase strictly monotonically as the fueling index k values increase.

Now, from comparing FIGS. 6 and 7, it may be seen that temporary fueling index $k_{temp}$ value at Point $A_0$ falls within control zone 2 of FIG. 7 which corresponds to the oxygen-to-fuel ratio OFR correction model.

As mentioned above, Point $A_0$ has an in-cylinder oxygen mass O2 value which is higher or greater than the predetermined in-cylinder oxygen mass O2 value for the corresponding temporary fueling index $k_{temp}$ value at the predetermined relationship 230.

With the oxygen-to-fuel ratio OFR correction model, when the current in-cylinder oxygen mass O2 value at the pedal-based $k_{temp}$ is higher or greater than the predetermined relationship 230, the temporary fueling index $k_{temp}$ value may now be increased such that the relationship of the fueling index k value to the oxygen mass O2 value may now approach the predetermined relationship 230 with use of the revised fueling index $k_{rev}$ value.

With a revised fueling index $k_{rev}$ value being greater than the temporary fueling index $k_{temp}$ value, the fuel quantity $Q_f$ is increased to reduce the oxygen concentration in the exhaust gas O2ce and to approach the predetermined relationship 230 in the next engine combustion cycle (i.e. a subsequent combustion cycle of the engine immediately following the current combustion cycle of the engine) using the following function:

$$\Delta O2 = -OFR_0 \times \Delta Q_f (OFR_0: \text{stoichiometric oxygen-fuel mass ratio})$$

or, stated another way:

$$Q_f = -1/OFR_0 \cdot \Delta O2 + Q_f(k_{temp})(\Delta O2 = O2 - O2_i)$$

As shown in FIG. 6, with use of the oxygen-to-fuel ratio OFR correction model, Point $A_0$ (at pedal based $k_{temp}$) may now be revised to identify Point $A_1$ by moving along the arrow according to the foregoing function diagonally downward until, for example, intersecting with the predetermined relationship 230. However, it should be understood that, with use of the oxygen-to-fuel ratio OFR correction model, multiple engine cycles may be necessary for the revised fueling index $k_{rev}$ value to intersect predetermined relationship 230. Thus, adjusting the temporary fueling index $k_{temp}$ value using the oxygen-to-fuel ratio OFR correction model may provide an incremental approach to the predetermined relationship 230 over a plurality of engine cycles.

It should be understood that the slopes of the diagonal dotted lines in FIG. 6 equals the stoichiometric oxygen-fuel ratio. Thus, in moving diagonally parallel with the stoichiometric oxygen-fuel ratio from Point $A_0$ to Point $A_1$, it may be understood that the oxygen-to-fuel ratio OFR correction model adjusts the temporary fueling index $k_{temp}$ value based on or otherwise using the stoichiometric oxygen-fuel ratio.

Conversely, when the current in-cylinder oxygen mass O2 value at the pedal-based $k_{temp}$ is lower or less than the predetermined relationship 230, the temporary fueling index $k_{temp}$ value may now be decreased such that the relationship of the fueling index k value to the oxygen mass O2 value may now approach the predetermined relationship 230 with use of the revised fueling index $k_{rev}$ value.

With a revised fueling index $k_{rev}$ value being less than the temporary fueling index $k_{temp}$ value, the fuel quantity $Q_f$ is decreased to increase the oxygen concentration in the exhaust gas O2ce and to approach the predetermined relationship 230 in the next engine combustion cycle.

As shown in FIG. 6, with use of the oxygen-to-fuel ratio OFR correction model, Point $B_0$ (at pedal based $k_{temp}$) may now be revised to identify Point $B_1$ by moving along the arrow according to the foregoing function diagonally upward until, for example, intersecting with the predetermined relationship 230. As indicated above, it should be understood that, with use of the oxygen-to-fuel ratio OFR correction model, multiple engine cycles may be necessary for the revised fueling index $k_{rev}$ value to intersect predetermined relationship 230. Thus, adjusting the temporary fueling index $k_{temp}$ value using the oxygen-to-fuel ratio OFR correction model may provide an incremental approach to the predetermined relationship 230 over a plurality of engine cycles.

With reference now to FIG. 7, and as explained in greater detail below, the oxygen-to-fuel ratio OFR correction model may be used when: (1) in-cylinder oxygen mass O2 values remain substantially constant as fueling index k values (and fuel quantity $Q_f$) increase as shown in control zone 2; (2) in-cylinder oxygen mass O2 values decrease as the fueling index k values (and fuel quantity $Q_f$) increase and in-cylinder oxygen mass O2 value is higher or greater than the predetermined relationship 230 at acceleration as shown in control zone 1B; or (3) in-cylinder oxygen mass O2 values decrease as the fueling index k values (and fuel quantity $Q_f$) increase and in-cylinder oxygen mass O2 value is lower or less than the predetermined relationship 230 at deceleration as shown in control zone 1C.

Figure 8:
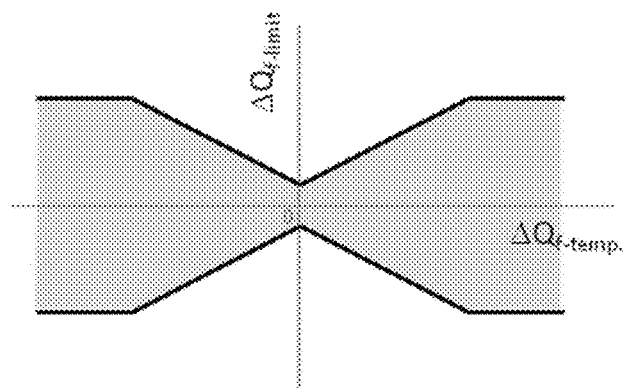
FIG. 8 illustrates an exemplary fuel quantity limitation to avoid unstable fuel quantity calculations.

To avoid unstable fuel quantity calculations, control system techniques (P, PI, PID, etc.) may be used to determine when fuel quantity changes and/or limitation of oxygen-to-fuel ratio OFR correction may be appropriate. With reference to FIG. 8, an example of a possible fuel quantity limitation is:

$$\Delta Q_{f\text{-}limit} = m \cdot \Delta Q_{f\text{-}temp} + C_0 (m, C_0; \text{constant})$$

Figure 9:
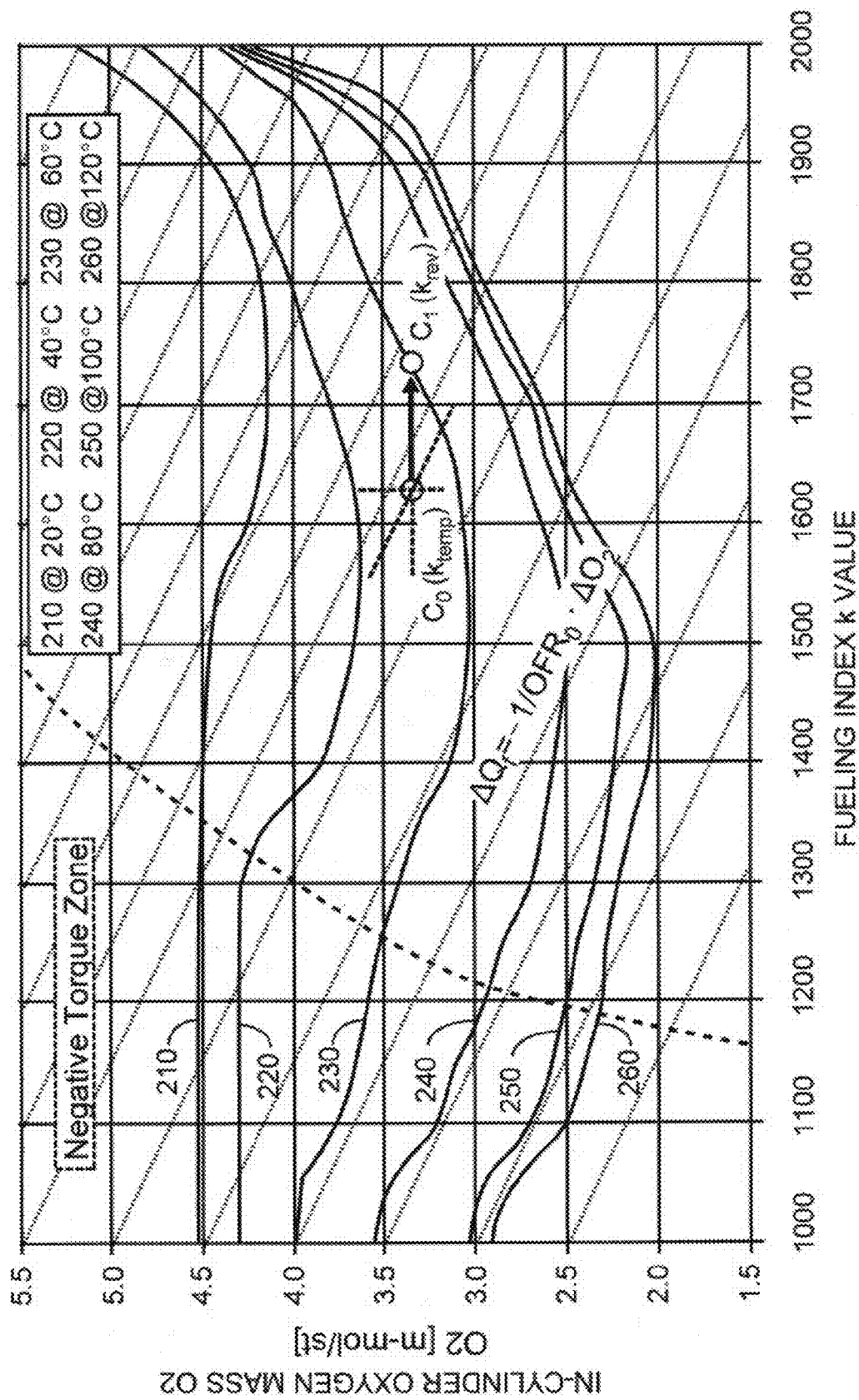
FIG. 9 illustrates exemplary relationships for in-cylinder oxygen mass O2 (y-axis) versus fueling index k value (x-axis) at various predetermined engine temperatures and application of a second fueling correction model.

Now, to illustrate use of the in-cylinder oxygen mass O2 correction model to be used when in-cylinder oxygen mass O2 drives fuel injection quantity $Q_f$, reference is now made to FIG. 9.

Point $C_0$ is shown to be a point which differs from the predetermined relationship 230 for in-cylinder oxygen mass O2 value (y-axis) versus fueling index k value (x-axis). In other words, Point $C_0$ is not located on line 230. More particularly, as shown, Point $C_0$ has an in-cylinder oxygen mass O2 value which is higher or greater than the predetermined in-cylinder oxygen mass O2 value for the corresponding temporary fueling index $k_{temp}$ value of the predetermined relationship 230.

Thus, the current relationship of the temporary fueling index $k_{temp}$ value to the calculated in-cylinder oxygen mass O2 value differs from the predetermined relationship 230, and the temporary fueling index $k_{temp}$ value may now be revised such that the revised relationship of the fueling index k value to the in-cylinder oxygen mass O2 value approaches the predetermined relationship 230 with use of a revised fueling index $k_{rev}$ value.

As set forth above, referring now briefly to FIG. 7, the determination as to which fueling correction model to utilize is dependent upon which control zone of the predetermined non-linear relationship 230 the temporary fueling index $k_{temp}$ falls within.

From comparing FIGS. 7 and 9, it may be seen that temporary fueling index $k_{temp}$ value at Point $C_0$ falls within control zone 3 of FIG. 7 which corresponds to the in-cylinder oxygen mass O2 correction model. In this situation, airflow mass ma leads fuel quantity $Q_f$, and the fueling index k value may be revised directly from the current in-cylinder oxygen mass O2.

As mentioned above, Point $C_0$ has an in-cylinder oxygen mass O2 value which is higher or greater than the predetermined in-cylinder oxygen mass O2 value for the corresponding temporary fueling index $k_{temp}$ value at the predetermined relationship 230.

With the in-cylinder oxygen mass O2 correction model, when the current in-cylinder oxygen mass O2 value is higher or greater than the predetermined relationship 230, the temporary fueling index $k_{temp}$ value may now be increased such that the relationship of the fueling index k value to the oxygen mass O2 value may now approach the predetermined relationship 230 with use of the revised fueling index $k_{rev}$ value. More particularly, the temporary fueling index $k_{temp}$ value may now be revised directly from the predetermined relationship 230 at the in-cylinder oxygen mass O2 value. For this model, the fueling index k value (and fuel injection quantity $Q_f$) and in-cylinder oxygen mass O2 relation is adjusted at the current combustion cycle.

As shown in FIG. 9, with use of the in-cylinder oxygen mass O2 correction model, the Point $C_0$ may now be adjusted to identify Point $C_1$ by moving along the arrow (i.e. horizontally) until, for example, intersecting with the predetermined relationship 230. Unlike the OFR correction model, it should be understood that, with use of the in-cylinder oxygen mass O2 correction model, multiple engine cycles are not necessary for the revised fueling index $k_{rev}$ value to intersect predetermined relationship 230. Thus, adjusting the temporary fueling index $k_{temp}$ value using the in-cylinder oxygen mass O2 correction model directly provides a revised fueling index $k_{rev}$ value at the predetermined relationship 230 over a single engine cycle.

Unlike the OFR correction model, the in-cylinder oxygen mass O2 correction model does not adjust the temporary fueling index $k_{temp}$ value using the stoichiometric oxygen-fuel ratio, but rather adjusts the temporary fueling index $k_{temp}$ value independent of the stoichiometric oxygen-fuel ratio.

With reference to FIG. 7, and as explained in greater detail below, the in-cylinder oxygen mass O2 correction model may be used when: (1) in-cylinder oxygen mass O2 values increase as fueling index k values (and fuel quantity $Q_f$) increase as shown in control zone 3A; (2) in-cylinder oxygen mass O2 values decrease as fueling index k values (and fuel quantity $Q_f$) increase and in-cylinder oxygen mass O2 value is lower or less than the predetermined relationship 230 at acceleration as shown in control zone 1C; or (3) in-cylinder oxygen mass O2 decreases when fueling index k values (and fuel quantity $Q_f$) increase and in-cylinder oxygen mass O2 value is higher or greater than the predetermined relationship 230 at deceleration as shown in control zone 1B.

More specifically, with respect to the control zones, in control zone 1, when in-cylinder oxygen mass O2 value is higher or greater than the predetermined relationship 230, but below a maximum predetermined in-cylinder oxygen mass O2, the oxygen-to-fuel ratio OFR correction model is applied during acceleration and the in-cylinder oxygen mass O2 correction model is applied during deceleration (see control zone 1B). When in-cylinder oxygen mass O2 value is lower or less than the predetermined relationship 230, but above a minimum predetermined in-cylinder oxygen mass O2, the oxygen-to-fuel ratio OFR correction model is applied during deceleration and the in-cylinder oxygen mass O2 correction model is applied during acceleration (see control zone 1C). Lastly, when in-cylinder oxygen mass O2 value is above a maximum predetermined in-cylinder oxygen mass O2 (see control zone 1A) or below a minimum predetermined in-cylinder oxygen mass O2 (see control zone one 1D), the oxygen-to-fuel ratio OFR correction model is applied.

The foregoing combinations of fueling correction models and conditions under which the models are applied, as well as combinations used in control zones 2 and 3 below, balance combustion stability with emissions production. For example, when in-cylinder oxygen mass O2 value is above the maximum predetermined in-cylinder oxygen mass O2 (see control zone 1A), which may result in emissions which are too high, the oxygen-to-fuel ratio OFR correction model is applied to increase fuel quantity $Q_f$ and reduce the oxygen mass. When in-cylinder oxygen mass O2 value is below the minimum predetermined in-cylinder oxygen mass O2 (see control zone one 1D), which may result in unstable combustion, the oxygen-to-fuel ratio OFR correction model is applied to reduce fuel quantity $Q_f$ and increase the oxygen mass.

In control zone 2, in-cylinder oxygen mass O2 values remains substantially constant as the fueling index k value is increased. The oxygen-to-fuel ratio OFR correction model is applied in an attempt to stay on the desired predetermined relationship 230. The in-cylinder oxygen mass O2 correction model may not be used in this zone due to the substantially constant in-cylinder oxygen mass O2 values with varying fueling index k values.

In control zone 3, in-cylinder oxygen mass O2 values increase as the fueling index k values increase. The in-cylinder oxygen mass O2 correction model is applied (see control zone 3A) except when the in-cylinder oxygen mass O2 is below the minimum predetermined in-cylinder oxygen mass O2 (see control zone 3D) in which case, the oxygen-to-fuel ratio OFR correction model is applied.

As shown above, FIGS. 6 and 9 show a plurality of functional predetermined (non-linear) relationships that directly relate fueling index k values and in-cylinder oxygen mass O2 values at a particular engine speed, wherein each of the relationships corresponds to a different predetermined engine temperature T* value.

Figure 10:
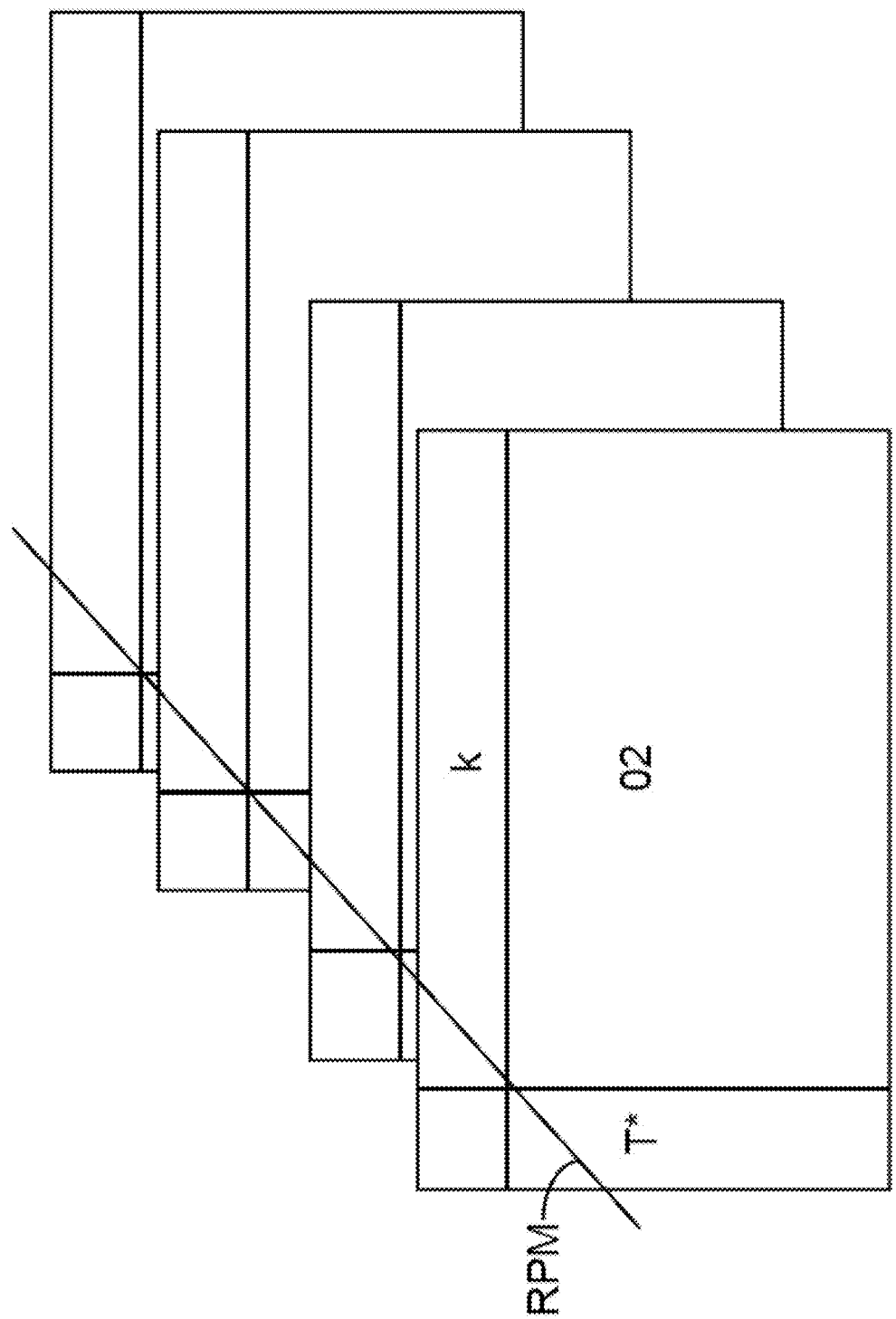
FIG. 10 illustrates a three-dimensional map comprising tables which map predetermined engine temperature values, fueling index k values and engine speed rpm to in-cylinder oxygen mass O2 values.

The graphical representation shown in FIGS. 6 and 9 may be stored in the fueling control module 25 of a vehicle in the form of a two dimensional map comprising a table which maps fueling index k values to in-cylinder oxygen mass O2 values at various predetermined engine temperature T*. Even more particularly, as shown in FIG. 10 to accommodate engine speed rpm, such may be stored in the fueling control module 25 of a vehicle in the form of a three-dimensional map comprising tables which maps fueling index k values to in-cylinder oxygen mass O2 values at various predetermined engine temperatures T* and engine speeds rpm.

Figure 11:
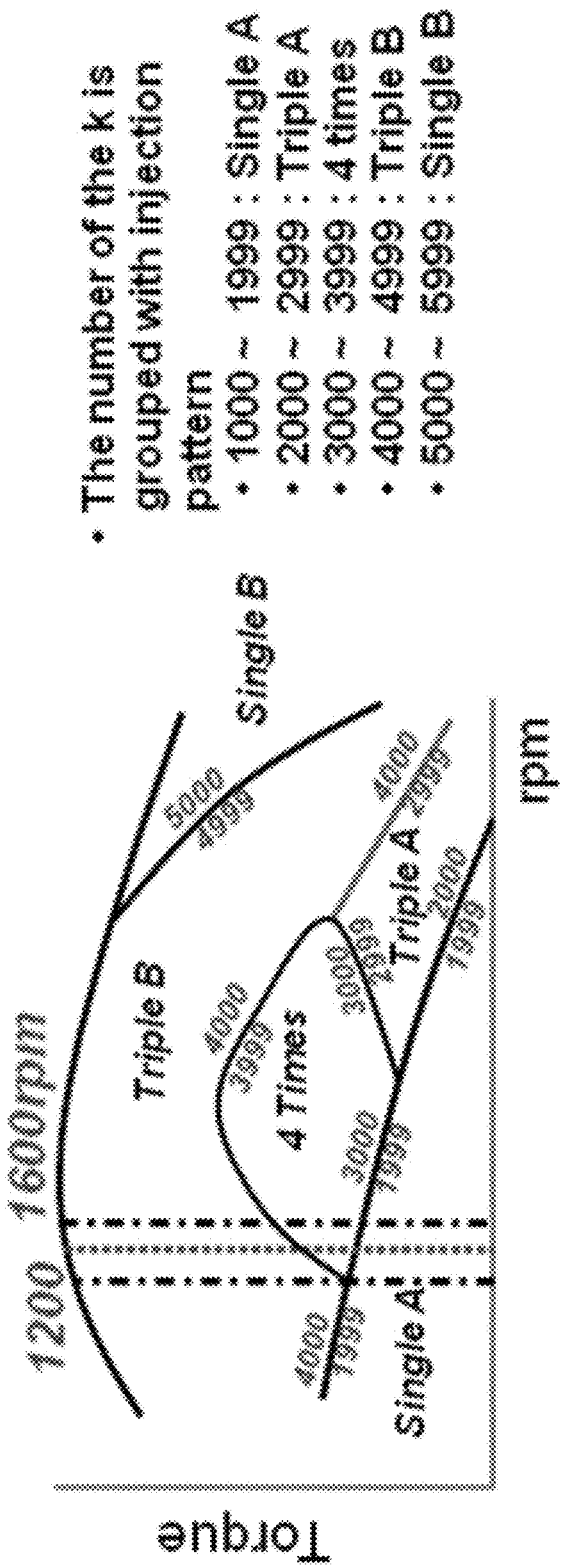
FIG. 11 illustrates torque (y-axis) versus engine speed rpm (x-axis) and including a fuel injection pattern map with the overall range of fueling index k values segmented or grouped into smaller ranges, with each range corresponding to certain injection patterns.

Referring back to FIG. 3, once the revised fueling index $k_{rev}$ value has been determined, the injection pattern may next be determined from the revised fueling index $k_{rev}$ value. Multiple injection patterns may be used to change mixing characteristics and combustion of oxygen and fuel, again with overriding consideration to balance combustion stability and emissions production. Referring now to FIG. 11, the use of the fueling index k may allow smooth injection pattern switching according to the fuel injection pattern map. As shown, the overall range of fueling index k values from 1,000 to 5,999 are segmented or grouped into smaller ranges of 999, with each of the smaller ranges corresponding to different injection patterns, such as number of injections.

At different engine speeds, the fueling index k value versus the torque representative TR is not the same. However, the fueling index k value is the same at injection pattern switching points for a specific injection pattern. On the border line for injection pattern switching, for example 1999 and 4000 at a certain engine speed, the k values are different but the torque representative TR is the same for both injection patterns. This arrangement provides smooth injection pattern switching without torque fluctuation.

Now, as set forth above, a three-dimensional map comprising tables which maps fueling index k values to in-cylinder oxygen mass O2 values at various predetermined engine temperatures T* and engine speeds rpm may be stored in the fueling control module 25. As also set forth above, it should be understood that the three-dimensional map may include predetermined engine temperature T* values which may ordinarily be encountered during operation of the engine 10 such as, for example, in increments of a single degree Celsius up to 20 degrees Celsius over a range of, for example, −40° C. to 115° C.

Similarly, it should be understood that the three-dimensional map may include most or all of the engine speed rpm values which may ordinarily be encountered during operation of the engine such as, for example, in increments of a single rpm up to 500 rpms over a range of, for example 1 rpm to the rpm redline (i.e. to the maximum engine speed rpm at which an internal combustion engine and its components are designed to operate without causing damage to the components themselves or other parts of the engine).

However, in the event that the current (actual) engine temperature T* value is not equal to one of the predetermined (mapped) values, and the actual engine speed rpm value is not equal to a predetermined (mapped) value, then the revised fueling index $k_{rev}$ value may be determined from interpolation.

Also as set forth above, control module 25 may be programmed to create a predetermined relationship when a stored map does not include a predetermined relationship at a particular engine temperature T* and engine speed rpm value by a two step interpolation.

For example, as shown in FIG. 12, if the engine temperature is 84° C. and the engine speed is 1362 rpm. Consequently, if engine 10 is at a temperature of 84° C., and the nearest above and below stored relationships are at 90° C. and 75° C., respectively, control module 25 may be programmed to create predetermined relationships at 84° C. by interpolation using the selected relationships at 75° C. and 90° C. Furthermore, it may be understood that a predetermined relationship at 84° C. may be created at each predetermined engine speed stored within control module 25. Thus, for the present example, control module 25 may first create predetermined relationships at 84° C., at the predetermined engine speeds of 1200 rpm and 1600 rpm. Thereafter, control module 25 may be programmed to create a predetermined relationship at 84° C. and 1362 rpm by a second interpolation using the created relationships at 1200 rpm and 1600 rpm. Thus, for the present example, control module 25 may create a predetermined relationship at 84° C. and 1362 rpm as shown in FIG. 12 using a two step interpolation process. It should be understood that the order of the interpolation is irrelevant. In other words, either the first or the second interpolation may be performed with the predetermined relationships being at different engine temperatures or engine rpm.

As set forth above, during transient conditions, the actual intake airflow and/or exhaust gas recirculation (EGR) flow may be delayed by turbo lag and/or EGR delay. Consequently, the intake oxygen concentration O2c and/or in-cylinder oxygen mass O2 may be different than the steady-state condition. As a result, emissions and combustion noise may undesirably increase when intake oxygen concentration O2c and/or in-cylinder oxygen mass O2 are higher or greater than a predetermined steady state value. Alternately, emissions may decrease when intake oxygen concentration O2c and/or in-cylinder oxygen mass O2 are lower or less than a predetermined steady state value, but combustion may become to slow or unstable. As a result, in addition to the foregoing correction models, injection timing control may be used to compensate for the effects of intake oxygen concentration O2c and/or in-cylinder oxygen mass O2 deviation.

Referring now to FIGS. 13 and 14, in addition to a standard three-dimensional map of predetermined engine temperature values, fueling index k values and engine speed rpm to in-cylinder oxygen mass O2 values as shown in FIG. 10 being stored in engine control unit 66 (or fueling control module 70), additional maps of the same parameters to intake oxygen concentration O2c (FIG. 13) and target fuel injection timing TFIN (FIG. 14) may also be stored in engine control unit 66 (or fueling control module 70).

Thus, once the revised fueling index $k_{rev}$ value has been determined, predetermined values for intake oxygen concentration O2c and target (uncorrected) fuel injection timing TFIN at the measured engine speed rpm and temperature T* are known in addition to the in-cylinder oxygen mass O2 value at the revised fueling index $k_{rev}$ value.

As set forth above, intake oxygen concentration O2c and/or in-cylinder oxygen mass O2 may deviate from their predetermined values at the revised fueling index $k_{rev}$, particularly during transient conditions. In such an event, the target fuel injection timing TFIN may be corrected using the injection timing correction map as shown in FIGS. 15 and 16 to adjust and revise the target injection timing TFIN either by increasing or decreasing the fuel injection timing.

Referring now to FIG. 17, in certain instances, the deviation in intake oxygen concentration ΔO2c and/or in-cylinder oxygen mass ΔO2 may be sufficiently large such that a maximum injection timing correction Δθmax is also stored in engine control unit 66 (or fueling control module 70). The maximum injection timing correction Δθmax may be used as a point to change injection patterns when the maximum injection timing correction Δθmax for a particular injection pattern would be exceeded (e.g. from single injection to multiple injections), or may be used as a maximum for a plurality of injection patterns (e.g. for some or all injection patterns).

In the case of gasoline engine (direct injection stratified engine), ignition timing is also controlled by change of intake oxygen concentration ΔO2c and change of the temperature representative ΔT* in a similar fashion as fuel injection timing control.

Once the revised fueling index $k_{rev}$ value, injection pattern, injection timing shift and any ignition timing shift are determined, all the fueling parameters are determined and may be commanded.

In another embodiment of the disclosure, as shown in FIG. 18, it may be possible that the oxygen-to-fuel ratio OFR correction model may be applied to approach the predetermined relationship 230 regardless of which control zone the in-cylinder oxygen mass O2 value and temporary fueling index k value are located.

Point $D_0$ has an in-cylinder oxygen mass O2 value which is higher or greater than the predetermined in-cylinder oxygen mass O2 value for the corresponding temporary fueling index $k_{temp}$ value at the predetermined relationship 230. When the current in-cylinder oxygen mass O2 value and pedal-based fuel quantity $Q_f$ (from pedal-based $k_{temp}$) are higher or greater than the predetermined relationship 230, the temporary fueling index $k_{temp}$ value may now be increased such that the relationship of the fueling index k value to the oxygen mass O2 value may now approach the predetermined relationship 230 with use of the revised fueling index $k_{rev}$ value. With a revised fueling index $k_{rev}$ value being greater than the temporary fueling index $k_{temp}$ value, the pedal-based fuel quantity $Q_f$ is increased to reduce the oxygen concentration in the exhaust gas O2ce and to approach the predetermined relationship 230 in the next engine cycle.

Point $E_0$ has an in-cylinder oxygen mass O2 value which is lower or less than the predetermined in-cylinder oxygen mass O2 value for the corresponding temporary fueling index $k_{temp}$ value at the predetermined relationship 230. When the current in-cylinder oxygen mass O2 value and pedal-based fuel quantity $Q_f$ (from pedal-based $k_{temp}$) are lower or less than the predetermined relationship 230, the temporary fueling index $k_{temp}$ value may now be decreased such that the relationship of the fueling index k value to the oxygen mass O2 value may now approach the predetermined relationship 230 with use of the revised fueling index $k_{rev}$ value. With a revised fueling index $k_{rev}$ value being less than the temporary fueling index $k_{temp}$ value, the pedal-based fuel quantity $Q_f$ is decreased to increase the oxygen concentration in the exhaust gas O2ce and to approach the predetermined relationship 230 in the next engine cycle.

In another embodiment of the disclosure, as shown in FIG. 19, the revised fueling index $k_{rev}$ value from the previous engine cycle ($k_{i-1}$) may be used as the temporary fueling index value ($k_{temp}$) for the current engine cycle ($k_i$). For example, the in-cylinder oxygen mass O2 for the current cycle may increase as shown from the revised fueling index value from the previous engine cycle $k_{rev(i-1)}$ to $k_{temp(i)}$ during acceleration. Thereafter, the $k_{temp(j)}$ during acceleration may be revised to $k_{rev(i)}$ as previously disclosed. Alternatively, the in-cylinder oxygen mass O2 for the current cycle may decrease as shown from the revised fueling index value from the previous engine cycle $k_{rev(i-1)}$ to $k_{temp(i)}$ during deceleration. Similarly, the $k_{temp(j)}$ during deceleration may be revised to $k_{rev(i)}$ as previously disclosed.

What is claimed:

1. A method to operate an internal combustion engine of a motor vehicle, the method comprising:
    storing a fueling command map having fueling index values, each of the fueling index values defining values for a plurality of fueling parameters, and a plurality of predetermined non-linear relationships that directly relate fueling index values to in-cylinder oxygen mass values;
    determining a temporary fueling index value;
    determining an in-cylinder oxygen mass value;
    identifying a predetermined relationship that directly relates fueling index values to in-cylinder oxygen mass values from the plurality of predetermined relationships to provide an identified predetermined relationship;
    determining that a current relationship of the temporary fueling index value to the calculated oxygen mass value differs from the identified predetermined relationship;
    adjusting the temporary fueling index value using at least one fueling correction model to provide a revised fueling index value that approaches the identified predetermined relationship; and
    wherein at least one of the plurality of predetermined non-linear relationships that directly relate fueling index values to in-cylinder oxygen mass values comprises a first control zone wherein the in-cylinder oxygen mass values decrease as the fueling index values increase, a second control zone wherein the in-cylinder oxygen mass values are substantially constant as the fueling index values increase, and a third control zone wherein the in-cylinder oxygen mass values increase as the fueling index values increase.

2. The method of claim 1 further comprising:
    receiving engine operating values representing accelerator pedal position and engine speed; and
    the temporary fueling index value is determined from at least one of the engine operating values representing the accelerator pedal position and the engine speed.

3. The method of claim 1 further comprising:
    receiving engine operating values representing intake airflow mass, a concentration of oxygen in an intake charge and a concentration of oxygen in exhaust gas; and
    the in-cylinder oxygen mass value is calculated at least in part from the engine operating values representing the intake airflow mass, the concentration of oxygen in the intake charge and the concentration of oxygen in the exhaust gas.

4. The method of claim 1 further comprising:
    using the revised fueling index value to determine values for the plurality of fueling parameters.

5. The method of claim 1 wherein:
    each of the plurality of predetermined relationships that directly relate fueling index values to oxygen mass values are configured to inhibit an emission of nitrogen oxides from the engine.

6. The method of claim 1 wherein:
    each of the plurality of predetermined relationships that directly relate fueling index values to oxygen mass values are at a different engine operating temperature.

7. The method of claim 6 further comprising:
    receiving engine operating values representing intake temperature and coolant temperature;
    determining an engine temperature representative value, wherein the engine temperature representative value is calculated at least in part from the engine operating values representing the intake temperature and the coolant temperature; and
    wherein the identified predetermined relationship is at an engine operating temperature equal to the engine temperature representative value.

8. The method of claim 1 wherein:
    each of the plurality of predetermined relationships that directly relate fueling index values to oxygen mass values are at a different engine speed.

9. The method of claim 8 further comprising:
    receiving engine operating values representing engine speed; and
    wherein the identified predetermined relationship is at an engine speed equal to the engine operating value representing engine speed.

10. The method of claim 1 further comprising:
    selecting the identified predetermined relationship that directly relates fueling index values to in-cylinder oxygen mass values from the plurality of predetermined relationships.

11. The method of claim 1 further comprises:
    creating the identified predetermined relationship that directly relates fueling index values to in-cylinder oxygen mass values from the plurality of predetermined relationships.

12. The method of claim 11 further comprising:
    creating the identified predetermined relationship that directly relates fueling index values to in-cylinder oxygen mass values from the plurality of predetermined relationships by linear interpolation.

13. The method of claim 11 further comprising:
    creating the identified predetermined relationship that directly relates fueling index values to in-cylinder oxygen mass values from the plurality of predetermined relationships at at least one of an operating temperature and an operating speed of the engine.

14. The method of claim 11 further comprising:
selecting a first predetermined relationship from the plurality of predetermined relationships that is above an operating temperature of the engine;
selecting a second predetermined relationship from the plurality of predetermined relationships that is below the operating temperature of the engine; and
creating the identified predetermined relationship that directly relates fueling index values to in-cylinder oxygen mass values from the first and second predetermined relationships, wherein the identified predetermined relationship is interpolated from the first and second predetermined relationships at the operating temperature of the engine.

15. The method of claim 11 further comprising:
selecting a first predetermined relationship from the plurality of predetermined relationships that is above an operating speed of the engine;
selecting a second predetermined relationship from the plurality of predetermined relationships that is below an operating speed of the engine; and
creating the identified predetermined relationship that directly relates fueling index values to in-cylinder oxygen mass values from the first and second predetermined relationships, wherein the identified predetermined relationship is interpolated from the first and second predetermined relationships at the operating speed of the engine.

16. The method of claim 1 further comprising:
receiving an engine operating value representing accelerator pedal position and engine speed; and
determining the temporary fueling index value from the engine operating values representing the accelerator pedal position and the engine speed after the engine has been started.

17. The method of claim 1 wherein:
the at least one fueling correction model is selected from a plurality of fueling correction models.

18. The method of claim 1 wherein:
the at least one fueling correction model comprises a model which adjusts the temporary fueling index value for a current combustion cycle of the engine.

19. The method of claim 1 wherein:
the at least one fueling correction model comprises a model which adjusts the temporary fueling index value for a subsequent combustion cycle of the engine immediately following a current combustion cycle of the engine.

20. The method of claim 1 wherein:
the at least one fueling correction model comprises a model which adjusts the temporary fueling index value independent of a stoichiometric oxygen-fuel ratio.

21. The method of claim 1 wherein:
the at least one fueling correction model comprises a model which adjusts the temporary fueling index value using a stoichiometric oxygen-fuel ratio.

22. The method of claim 1 wherein:
in the first control zone the oxygen mass values decrease strictly monotonically as the fueling index values increase.

23. The method of claim 1 wherein:
in the third control zone the oxygen mass values increase strictly monotonically as the fueling index values increase.

24. The method of claim 1 wherein:
adjusting the temporary fueling index value using at least one fueling correction model to provide a revised fueling index value that approaches the identified predetermined relationship further comprises
adjusting the temporary fueling index value using a stoichiometric oxygen-fuel ratio when,
the current relationship of the temporary fueling index value to the calculated oxygen mass value is in the first control zone of the predetermined relationship, and
the calculated oxygen mass value is greater than a predetermined oxygen mass value at a same fuel index value as the temporary fuel index value, and
the calculated oxygen mass value is greater than a maximum predetermined oxygen value for the second control zone of the predetermined relationship.

25. The method of claim 1 wherein:
adjusting the temporary fueling index value using at least one fueling correction model to provide a revised fueling index value that approaches the identified predetermined relationship further comprises
adjusting the temporary fueling index value using a stoichiometric oxygen-fuel ratio when,
the current relationship of the temporary fueling index value to the calculated oxygen mass value is in the first control zone of the predetermined relationship, and
the calculated oxygen mass value is greater than a predetermined oxygen mass value at a same fuel index value as the temporary fuel index value, and
the calculated oxygen mass value is less than or equal to a maximum predetermined oxygen value for the second control zone of the predetermined relationship, and
there is an acceleration of the vehicle.

26. The method of claim 1 wherein:
adjusting the temporary fueling index value using at least one fueling correction model to provide a revised fueling index value that approaches the identified predetermined relationship further comprises
adjusting the temporary fueling index value independent of a stoichiometric oxygen-fuel ratio when,
the current relationship of the temporary fueling index value to the calculated oxygen mass value is in the first control zone of the predetermined relationship, and
the calculated oxygen mass value is greater than a predetermined oxygen mass value at a same fuel index value as the temporary fuel index value, and
the calculated oxygen mass value is less than or equal to a maximum predetermined oxygen value for the second control zone of the predetermined relationship, and
there is a deceleration of the vehicle.

27. The method of claim 1 wherein:
adjusting the temporary fueling index value using at least one fueling correction model to provide a revised fueling index value that approaches the identified predetermined relationship further comprises
adjusting the temporary fueling index value using a stoichiometric oxygen-fuel ratio when,
the current relationship of the temporary fueling index value to the calculated oxygen mass value is in the first control zone of the predetermined relationship, and
the calculated oxygen mass value is less than a predetermined oxygen mass value at a same fuel index value as the temporary fuel index value, and the calculated oxygen mass value is less than a minimum predetermined oxygen value for the second control zone of the predetermined relationship.

28. The method of claim 1 wherein:
adjusting the temporary fueling index value using at least one fueling correction model to provide a revised fueling index value that approaches the identified predetermined relationship further comprises
adjusting the temporary fueling index value independent of a stoichiometric oxygen-fuel ratio when,
the current relationship of the temporary fueling index value to the calculated oxygen mass value is in the first control zone of the predetermined relationship, and
the calculated oxygen mass value is less than a predetermined oxygen mass value at a same fuel index value as the temporary fuel index value, and
the calculated oxygen mass value is greater than or equal to a minimum predetermined oxygen value for the second control zone of the predetermined relationship,
there is an acceleration of the vehicle.

29. The method of claim 1 wherein:
adjusting the temporary fueling index value using at least one fueling correction model to provide a revised fueling index value that approaches the identified predetermined relationship further comprises
adjusting the temporary fueling index value using a stoichiometric oxygen-fuel ratio when,
the current relationship of the temporary fueling index value to the calculated oxygen mass value is in the first control zone of the predetermined relationship, and
the calculated oxygen mass value is less than a predetermined oxygen mass value at a same fuel index value as the temporary fuel index value, and
the calculated oxygen mass value is greater than or equal to a minimum predetermined oxygen value for the second control zone of the predetermined relationship,
there is a deceleration of the vehicle.

30. The method of claim 1 wherein:
adjusting the temporary fueling index value using at least one fueling correction model to provide a revised fueling index value that approaches the identified predetermined relationship further comprises
adjusting the temporary fueling index value using a stoichiometric oxygen-fuel ratio when,
the current relationship of the temporary fueling index value to the calculated oxygen mass value is in the second control zone of the predetermined relationship.

31. The method of claim 1 wherein:
adjusting the temporary fueling index value using at least one fueling correction model to provide a revised fueling index value that approaches the identified predetermined relationship further comprises
adjusting the temporary fueling index value using a stoichiometric oxygen-fuel ratio when,
the current relationship of the temporary fueling index value to the calculated oxygen mass value is in the third control zone of the predetermined relationship, and
the calculated oxygen mass value is less than a minimum predetermined oxygen value for the second control zone of the predetermined relationship.

32. The method of claim 1 wherein:
adjusting the temporary fueling index value using at least one fueling correction model to provide a revised fueling index value that approaches the identified predetermined relationship further comprises
adjusting the temporary fueling index value independent of a stoichiometric oxygen-fuel ratio when,
the current relationship of the temporary fueling index value to the calculated oxygen mass value is in the third control zone of the predetermined relationship, and
the calculated oxygen mass value is greater than or equal to a minimum predetermined oxygen value for the second control zone of the predetermined relationship.

33. The method of claim 1 further comprising:
receiving an engine operating value representing a concentration of oxygen in an intake charge;
sensing a deviation of the concentration of oxygen in the intake charge from a steady state condition; and
changing at least one of injection timing, injection pattern and ignition timing to compensate for the deviation.

34. The method of claim 1 further comprising:
sensing a deviation of the in-cylinder oxygen mass value from a steady state condition; and
changing at least one of injection timing, injection pattern and ignition timing to compensate for the deviation.

35. The method of claim 1 wherein:
the plurality of fueling parameters include fuel injection quantity, fuel injection timing and fuel injection pressure; and
the values for the plurality of fueling parameters include values for the fuel injection quantity, the fuel injection timing and the fuel injection pressure.

36. The method of claim 1 wherein:
the plurality of fueling parameters are part of a fueling command.

37. The method of claim 1 wherein:
the fueling index values of the fueling command map increase monotonically with increasing torque.

38. The method of claim 1 wherein:
a range of the fueling index values is segmented into a plurality of smaller ranges, which each one of the smaller ranges corresponding to a different fuel injection patterns.

39. The method of claim 1 wherein:
the revised fueling index value is used as the temporary fueling index value during a combustion cycle of the engine subsequent to a current combustion cycle of the engine.

40. The method of claim 39 wherein:
the engine has a plurality of cylinders; and
the subsequent combustion cycle occurs in a same cylinder of the engine as the current combustion cycle of the engine.

41. The method of claim 39 wherein:
the engine has a plurality of cylinders; and
the subsequent combustion cycle occurs in a cylinder of the engine which is different from the current combustion cycle of the engine.

42. The method of claim 39 wherein:
the subsequent combustion cycle is a combustion cycle which next follows the current combustion cycle of the engine.

43. A method to operate an internal combustion engine of a motor vehicle, the method comprising:
storing a fueling command map having fueling index values, each of the fueling index values defining values for a plurality of fueling parameters, and a plurality of predetermined non-linear relationships that directly relate fueling index values to in-cylinder oxygen mass values;

determining a temporary fueling index value;

determining an in-cylinder oxygen mass value;

identifying a predetermined relationship that directly relates fueling index values to in-cylinder oxygen mass values from the plurality of predetermined relationships to provide an identified predetermined relationship;

determining that a current relationship of the temporary fueling index value to the calculated oxygen mass value differs from the identified predetermined relationship;

adjusting the temporary fueling index value using at least one fueling correction model to provide a revised fueling index value that approaches the identified predetermined relationship; and creating the identified predetermined relationship that directly relates fueling index values to in-cylinder oxygen mass values from the plurality of predetermined relationships by
- selecting a first predetermined relationship from the plurality of predetermined relationships that is above an operating temperature of the engine;
- selecting a second predetermined relationship from the plurality of predetermined relationships that is below the operating temperature of the engine; and
- creating the identified predetermined relationship that directly relates fueling index values to in-cylinder oxygen mass values from the first and second predetermined relationships, wherein the identified predetermined relationship is interpolated from the first and second predetermined relationships at the operating temperature of the engine.

44. The method of claim 43 further comprising:
receiving engine operating values representing accelerator pedal position and engine speed; and
the temporary fueling index value is determined from at least one of the engine operating values representing the accelerator pedal position and the engine speed.

45. The method of claim 43 further comprising:
receiving engine operating values representing intake airflow mass, a concentration of oxygen in an intake charge and a concentration of oxygen in exhaust gas; and
the in-cylinder oxygen mass value is calculated at least in part from the engine operating values representing the intake airflow mass, the concentration of oxygen in the intake charge and the concentration of oxygen in the exhaust gas.

46. The method of claim 43 further comprising:
using the revised fueling index value to determine values for the plurality of fueling parameters.

47. The method of claim 43 wherein:
each of the plurality of predetermined relationships that directly relate fueling index values to oxygen mass values are configured to inhibit an emission of nitrogen oxides from the engine.

48. The method of claim 43 wherein:
each of the plurality of predetermined relationships that directly relate fueling index values to oxygen mass values are at a different engine operating temperature.

49. The method of claim 48 further comprising:
receiving engine operating values representing intake temperature and coolant temperature;
determining an engine temperature representative value, wherein the engine temperature representative value is calculated at least in part from the engine operating values representing the intake temperature and the coolant temperature; and wherein the identified predetermined relationship is at an engine operating temperature equal to the engine temperature representative value.

50. The method of claim 43 wherein:
each of the plurality of predetermined relationships that directly relate fueling index values to oxygen mass values are at a different engine speed.

51. The method of claim 50 further comprising:
receiving engine operating values representing engine speed; and
wherein the identified predetermined relationship is at an engine speed equal to the engine operating value representing engine speed.

52. The method of claim 43 further comprising:
selecting the identified predetermined relationship that directly relates fueling index values to in-cylinder oxygen mass values from the plurality of predetermined relationships.

53. The method of claim 43 further comprising:
creating the identified predetermined relationship that directly relates fueling index values to in-cylinder oxygen mass values from the plurality of predetermined relationships by linear interpolation.

54. The method of claim 43 further comprising:
receiving an engine operating value representing accelerator pedal position and engine speed; and
determining the temporary fueling index value from the engine operating values representing the accelerator pedal position and the engine speed after the engine has been started.

55. The method of claim 43 wherein:
the at least one fueling correction model comprises a model which adjusts the temporary fueling index value independent of a stoichiometric oxygen-fuel ratio.

56. The method of claim 43 wherein:
the at least one fueling correction model comprises a model which adjusts the temporary fueling index value using a stoichiometric oxygen-fuel ratio.

57. The method of claim 43 wherein:
a range of the fueling index values is segmented into a plurality of smaller ranges, which each one of the smaller ranges corresponding to a different fuel injection patterns.

58. The method of claim 43 wherein:
the revised fueling index value is used as the temporary fueling index value during a combustion cycle of the engine subsequent to a current combustion cycle of the engine.

59. A method to operate an internal combustion engine of a motor vehicle, the method comprising:
storing a fueling command map having fueling index values, each of the fueling index values defining values for a plurality of fueling parameters, and a plurality of predetermined non-linear relationships that directly relate fueling index values to in-cylinder oxygen mass values;
determining a temporary fueling index value;
determining an in-cylinder oxygen mass value;
identifying a predetermined relationship that directly relates fueling index values to in-cylinder oxygen mass values from the plurality of predetermined relationships to provide an identified predetermined relationship;
determining that a current relationship of the temporary fueling index value to the calculated oxygen mass value differs from the identified predetermined relationship;

adjusting the temporary fueling index value using at least one fueling correction model to provide a revised fueling index value that approaches the identified predetermined relationship; and creating the identified predetermined relationship that directly relates fueling index values to in-cylinder oxygen mass values from the plurality of predetermined relationships by selecting a first predetermined relationship from the plurality of predetermined relationships that is above an operating speed of the engine;

selecting a second predetermined relationship from the plurality of predetermined relationships that is below the operating speed of the engine; and creating the identified predetermined relationship that directly relates fueling index values to in-cylinder oxygen mass values from the first and second predetermined relationships, wherein the identified predetermined relationship is interpolated from the first and second predetermined relationships at the operating speed of the engine.

60. The method of claim 59 further comprising:

receiving engine operating values representing accelerator pedal position and engine speed; and the temporary fueling index value is determined from at least one of the engine operating values representing the accelerator pedal position and the engine speed.

61. The method of claim 59 further comprising:

receiving engine operating values representing intake airflow mass, a concentration of oxygen in an intake charge and a concentration of oxygen in exhaust gas; and the in-cylinder oxygen mass value is calculated at least in part from the engine operating values representing the intake airflow mass, the concentration of oxygen in the intake charge and the concentration of oxygen in the exhaust gas.

62. The method of claim 59 further comprising:

using the revised fueling index value to determine values for the plurality of fueling parameters.

63. The method of claim 59 wherein:

each of the plurality of predetermined relationships that directly relate fueling index values to oxygen mass values are configured to inhibit an emission of nitrogen oxides from the engine.

64. The method of claim 59 wherein:

each of the plurality of predetermined relationships that directly relate fueling index values to oxygen mass values are at a different engine operating temperature.

65. The method of claim 64 further comprising:

receiving engine operating values representing intake temperature and coolant temperature;

determining an engine temperature representative value, wherein the engine temperature representative value is calculated at least in part from the engine operating values representing the intake temperature and the coolant temperature; and wherein the identified predetermined relationship is at an engine operating temperature equal to the engine temperature representative value.

66. The method of claim 59 wherein:

each of the plurality of predetermined relationships that directly relate fueling index values to oxygen mass values are at a different engine speed.

67. The method of claim 66 further comprising:

receiving engine operating values representing engine speed; and wherein the identified predetermined relationship is at an engine speed equal to the engine operating value representing engine speed.

68. The method of claim 59 further comprising:

selecting the identified predetermined relationship that directly relates fueling index values to in-cylinder oxygen mass values from the plurality of predetermined relationships.

69. The method of claim 59 further comprising:

creating the identified predetermined relationship that directly relates fueling index values to in-cylinder oxygen mass values from the plurality of predetermined relationships by linear interpolation.

70. The method of claim 59 further comprising:

receiving an engine operating value representing accelerator pedal position and engine speed; and determining the temporary fueling index value from the engine operating values representing the accelerator pedal position and the engine speed after the engine has been started.

71. The method of claim 59 wherein:

the at least one fueling correction model comprises a model which adjusts the temporary fueling index value independent of a stoichiometric oxygen-fuel ratio.

72. The method of claim 59 wherein:

the at least one fueling correction model comprises a model which adjusts the temporary fueling index value using a stoichiometric oxygen-fuel ratio.

73. The method of claim 59 wherein:

a range of the fueling index values is segmented into a plurality of smaller ranges, which each one of the smaller ranges corresponding to a different fuel injection patterns.

74. The method of claim 59 wherein:

the revised fueling index value is used as the temporary fueling index value during a combustion cycle of the engine subsequent to a current combustion cycle of the engine.

* * * * *